US010850357B2

(12) United States Patent
Ibarra et al.

(10) Patent No.: US 10,850,357 B2
(45) Date of Patent: Dec. 1, 2020

(54) MACHINE TOOL

(71) Applicant: ETXE-TAR, S.A., Elgoibar (ES)

(72) Inventors: Jorge Ibarra, Elgoibar (ES); Ibon Iribarren, Elgoibar (ES); Robert Joseph Healy, Elgoibar (ES)

(73) Assignee: ETXE-TAR, S.A., Elgoibar (ES)

( * ) Notice: Subject to any disclaimer, the term of this patent is extended or adjusted under 35 U.S.C. 154(b) by 0 days.

(21) Appl. No.: 16/277,047

(22) Filed: Feb. 15, 2019

(65) Prior Publication Data
US 2019/0176278 A1 Jun. 13, 2019

Related U.S. Application Data

(62) Division of application No. 15/302,144, filed as application No. PCT/EP2015/057139 on Apr. 1, 2015, now Pat. No. 10,239,168.

(30) Foreign Application Priority Data

Apr. 8, 2014 (EP) ..................................... 14382135

(51) Int. Cl.
*B23Q 1/48* (2006.01)
*B23Q 1/66* (2006.01)
(Continued)

(52) U.S. Cl.
CPC ............ *B23Q 1/623* (2013.01); *B23B 39/161* (2013.01); *B23C 1/04* (2013.01); *B23Q 1/66* (2013.01);
(Continued)

(58) Field of Classification Search
CPC .......... B23Q 1/66; B23Q 1/623; B23Q 39/04; B23Q 2039/006; B23Q 1/4852;
(Continued)

(56) References Cited

U.S. PATENT DOCUMENTS 3,997,127 A 12/1976 Kovaleski
3,998,127 A * 12/1976 Romeu ..................... B23C 1/14
409/225

(Continued)

FOREIGN PATENT DOCUMENTS

CN 1644293 A 7/2005
CN 201076990 Y 6/2008
(Continued)

OTHER PUBLICATIONS

H. J. Stadtfeld, "Die Zweite Revolution Im Verzahnen Von Kegelrädern", Werkstatt Und Betrieb, Carl Hanser Verlag GMBH&CO. KG, DE, Jun. 1, 2003, vol. 136, No. 6, pp. 10-14, 16 and 18, XP001169395.
(Continued)

*Primary Examiner* — Erica E Cadugan
(74) *Attorney, Agent, or Firm* — Cantor Colburn LLP

(57) ABSTRACT

Machine tool including a workpiece carrier assembly including a workpiece carrier for supporting a plurality of workpieces, the workpiece carrier assembly being supported on a workpiece carrier support for horizontal movement in a first direction parallel with a horizontal Z axis, a tool carrier configured for carrying a plurality of tools corresponding to the plurality of workpieces and for machining the workpieces, the tool carrier being supported on a tool carrier support for horizontal movement in a second direction parallel to a horizontal X axis, the X axis being perpendicular to the horizontal Z axis, where the tool carrier is displaceable on the tool carrier support in the second direction between an operative position in which the tools are arranged for the contacting the workpieces and an inoperative position in which the workpieces are not contactable by the tools, where the workpiece carrier is arranged to be rotatable around an axis parallel with the X axis, and where the workpiece carrier includes a workpiece support area for (Continued)

supporting the workpieces and arranged substantially in parallel with the X axis.

19 Claims, 20 Drawing Sheets

(51) Int. Cl.
| | | |
|---|---|---|
| *B23Q 7/02* | (2006.01) | |
| *B23Q 11/08* | (2006.01) | |
| *B23Q 39/04* | (2006.01) | |
| *B23Q 39/02* | (2006.01) | |
| *B23B 39/16* | (2006.01) | |
| *B23Q 1/62* | (2006.01) | |
| *B23C 1/04* | (2006.01) | |
| *B23Q 39/00* | (2006.01) | |

(52) U.S. Cl.
CPC ............ *B23Q 7/02* (2013.01); *B23Q 11/0891* (2013.01); *B23Q 39/022* (2013.01); *B23Q 39/04* (2013.01); *B23C 2215/245* (2013.01); *B23Q 2039/006* (2013.01); *Y10T 408/385* (2015.01); *Y10T 408/3806* (2015.01); *Y10T 409/30392* (2015.01); *Y10T 409/305768* (2015.01); *Y10T 409/305824* (2015.01); *Y10T 409/307784* (2015.01); *Y10T 483/115* (2015.01)

(58) Field of Classification Search
CPC .. B23Q 1/4857; B23Q 1/4861; B23Q 1/4866; B23Q 1/4871; B23Q 2039/002; B23Q 39/021–39/027; B23Q 3/155–3/15793; B23Q 11/08–11/0891; Y10T 409/306048; Y10T 409/30532; Y10T 409/305824; Y10T 409/30896; Y10T 408/3806; Y10T 409/305768; Y10T 408/36–385; Y10T 409/307168; Y10T 409/307784; Y10T 409/308344; Y10T 409/308565; Y10T 409/30392; Y10T 483/115; B23C 1/04; B23C 1/045; B23C 1/08; B23B 39/161; B23B 39/16–39/24; B24B 27/0023
USPC ....... 409/172, 159, 168, 224, 167, 192, 203, 409/213, 217, 134; 408/31–53; 483/3
See application file for complete search history.

(56) References Cited

U.S. PATENT DOCUMENTS

| | | | | |
|---|---|---|---|---|
| 5,172,464 | A | 12/1992 | Kitamura et al. | |
| 6,224,462 | B1 * | 5/2001 | Yokoyama | B24B 5/00 451/10 |
| 6,228,007 | B1 | 5/2001 | Quak et al. | |
| 6,298,531 | B1 * | 10/2001 | Baumbusch | B23Q 1/015 29/36 |
| 6,629,345 | B2 * | 10/2003 | Albeck | B23Q 3/061 269/900 |
| 7,063,653 | B2 * | 6/2006 | Horibe | B23Q 3/15526 409/134 |
| 7,442,154 | B2 | 10/2008 | Boehler et al. | |
| 7,621,030 | B2 | 11/2009 | Lombacher et al. | |
| 9,694,461 | B2 | 7/2017 | Haas et al. | |
| 9,914,189 | B2 * | 3/2018 | Burkhardt | B23Q 1/015 |
| 10,207,381 | B2 * | 2/2019 | Burkhardt | B23Q 1/623 |
| 2002/0050508 | A1 | 5/2002 | Yoshinaga | |
| 2004/0176229 | A1 | 9/2004 | Soroka et al. | |
| 2005/0271488 | A1 | 12/2005 | Liechti et al. | |
| 2006/0048361 | A1 * | 3/2006 | Corbean | B23Q 39/02 29/27 C |
| 2008/0188363 | A1 | 8/2008 | Baumbusch et al. | |
| 2008/0213057 | A1 | 9/2008 | Betschon et al. | |
| 2011/0005074 | A1 | 1/2011 | Ayestaran Lazcano et al. | |
| 2012/0189395 | A1 | 7/2012 | Affaticati et al. | |
| 2013/0210594 | A1 * | 8/2013 | Schuster | B23Q 1/64 483/22 |
| 2014/0187397 | A1 * | 7/2014 | Abeln | B23Q 3/15526 483/1 |
| 2014/0187398 | A1 * | 7/2014 | Abeln | B23Q 3/15706 483/1 |
| 2017/0050282 | A1 * | 2/2017 | Kruck | B23Q 3/061 |

FOREIGN PATENT DOCUMENTS

| | | |
|---|---|---|
| CN | 201235426 Y | 5/2009 |
| CN | 101990476 A | 3/2011 |
| CN | 102574228 A | 7/2012 |
| DE | 102005058347 A1 * | 6/2007 |
| DE | 102007044282 A1 * | 3/2009 |
| DE | 202010008327 U1 | 1/2012 |
| DE | 102015115542 A1 | 3/2017 |
| DE | 102017122439 A1 * | 4/2018 |
| EP | 1201347 A2 | 5/2002 |
| EP | 1642673 A1 | 4/2006 |
| EP | 2431126 A1 * | 3/2012 |
| EP | 3017910 A2 * | 5/2016 |
| JP | H06134601 A | 5/1994 |
| RU | 2022759 C1 | 11/1994 |
| RU | 2080974 C1 | 6/1997 |
| SU | 1625664 A1 | 2/1991 |
| WO | 2008089751 A1 | 7/2008 |
| WO | 2012156541 A1 | 5/2011 |

OTHER PUBLICATIONS

International Search Report dated Jan. 7, 2016 re: Application No. PCT/EP2015/057139; pp. 1-4; citing: H J Stadtfeld, EP 1 201 347 A2, JP H0 134601 A and DE 20 2010 008327 U1.
Written Opinion dated Jan. 7, 2016 re: Application No. PCT/EP2015/057139; pp. 1-5; citing: H J Stadtfeld, EP 1 201 347 A2, JP H0 134601 A and DE 20 2010 008327 U1.

* cited by examiner

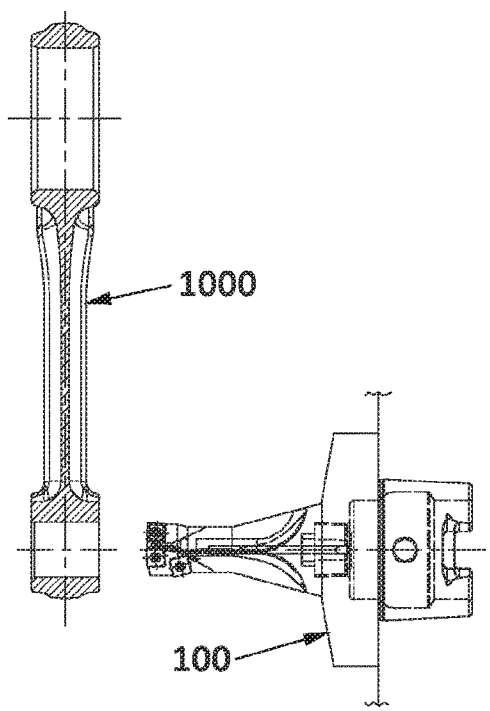
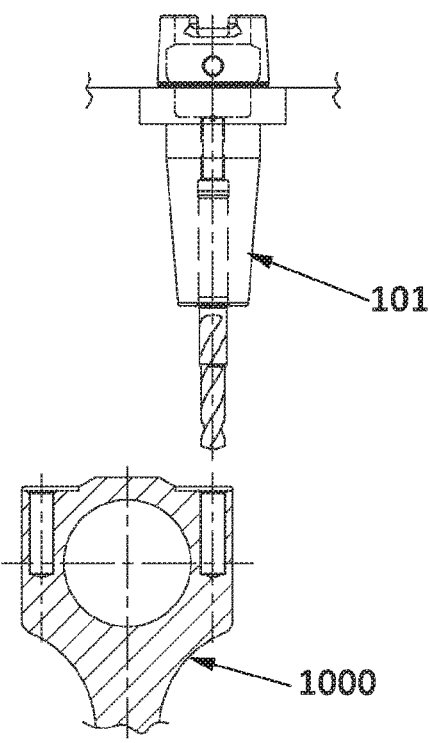
FIG. 1A  FIG. 1B
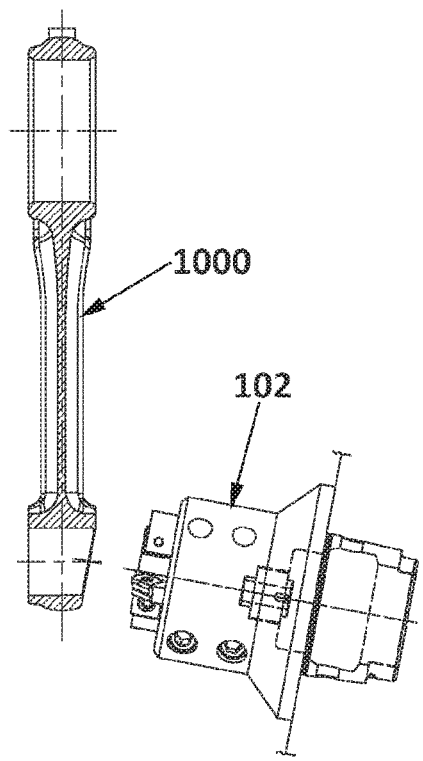
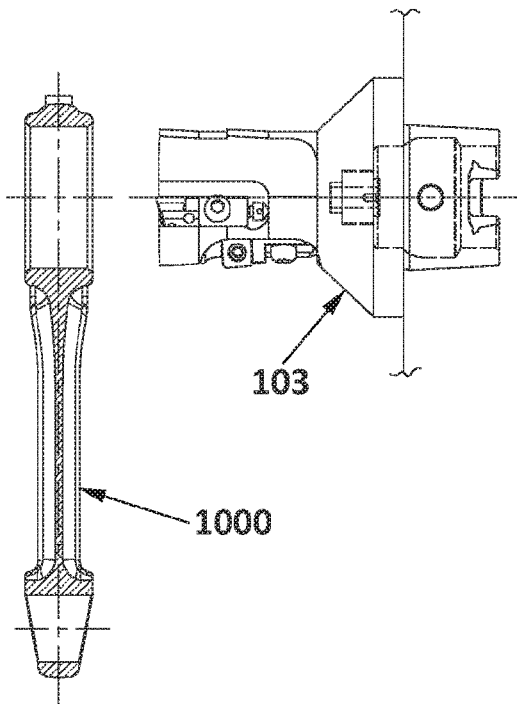
FIG. 1C  FIG. 1D

MACHINE TOOL

CROSS REFERENCE TO RELATED APPLICATIONS

This application is a divisional of and claims priority under 35 U.S.C. § 120 to U.S. patent application Ser. No. 15/302,144, which was filed on Oct. 5, 2016 under 35 U.S.C. §§ 365 and 371 as the U.S. National Stage of International Application Number PCT/EP2015/057139 filed Apr. 1, 2015 claiming priority to European Patent Application Serial No. 14382135.3, filed Apr. 8, 2014. The entire contents of the aforementioned applications are herein expressly incorporated by reference.

TECHNICAL FIELD

The disclosure is related to the field of machine tools.

BACKGROUND

Machine tools are used for machining workpieces, such as work pieces of metal, to provide them with the desired shape and configuration, for example, by drilling or boring holes in the workpieces and/or by machining edges to give them a desired, for example, a beveled, shape. For example, the machining of a connecting rod for connecting the piston to the crankshaft of a reciprocating piston engine involves several different operations which can be performed in one machine tool or sequentially in different machine tools, which can be different or which can have the same basic design but being equipped with different tools, adapted to performing the specific operations. For example, machining this kind of connecting rod can typically include several or all of the following steps:

rough grinding of the surfaces of the blank
rough boring of the pin hole and the crank hole
machining bolt holes and seats
cracking the connecting rod (body and cap) and bolts assembly
finish grinding of the surfaces
milling trapezoid and semifinishing crank hole
finish boring pin hole and crank hole.

For example, FIGS. 1A-1D show how some of these operations can be carried out on a connecting rod blank 1000 by using different tools 100, 101,102,103 which can be connected to respective spindle heads to be driven by one or more electrical motors, for rotary movement about, for example, a horizontal Z axis (not illustrated in FIG. 1), in a conventional manner. For example, FIG. 1A shows boring of the pin hole with a first tool 100, FIG. 1B shows the machining of bolt holes using a second tool 101, FIG. 1C shows the milling of a trapezoidal end of the blank using a third tool 102, and FIG. 1D shows boring of the crank hole using a fourth tool 103. All of these steps can be carried out by one machine tool, in which the different tools are mounted simultaneously or sequentially. It is, of course, also possible to carry out different steps using different machine tools.

Machines of this type are normally provided with some kind of tool carrier, in which the tools can be replaced depending on the task to be performed by the machine at a certain time or for a certain period. In this specification, the term "tool" is to be interpreted in a generic sense, and can, but must not, include an associated spindle head.

Machine tools for performing machining operations such as drilling and milling, for example, by rotary motion of a tool, for example, for shaping and boring connecting rods for reciprocating piston engines, are well known in the art, and it is thus not considered necessary to describe the operation of a tool drive or of a tool holding mechanism, as the skilled person is aware of how to design this kind of equipment and as appropriate devices are commercially available.

Machine tools are conventionally numerically controlled and in machine tools with rotary tools, machining is performed by producing a controlled relative movement between the workpiece and the corresponding tool. For example, it is known to provide a machine with one or more fixed tools, and to move one or more workpieces, such as a workpiece or blank out of which a connecting rod is to be obtained, in relation to the fixed tool, for example, in parallel with a first horizontal axis (this axis can be the axis around which a tool rotates, or an axis parallel with that axis), in parallel with another horizontal axis perpendicular to the first horizontal axis, and in parallel with a vertical axis.

U.S. Pat. No. 7,442,154 discloses a machine tool comprising a frame in which tools can be mounted in tool carriers, which can be tool spindles. Different tools can be applied at different heights of the frame. A workpiece carrier is provided which can move a workpiece in three different, orthogonal, directions, that is, in a vertical direction and in two perpendicular horizontal directions. The workpiece carrier can also be rotated around a horizontal axis.

Another example of this kind of machine is known from WO-A-2008/089751, which discloses a machine tool based on a reticular frame structure, in which tools can be fixed. The machine tool includes a workpiece carrier which can be displaced along an X-Y-Z guide.

It is observed that when replacing the tools in the machine of U.S. Pat. No. 7,442,154, the operator must access the space within the tool holding frame. Similarly, when replacing the tools in a machine tool as known from WO-A-2008/089751, the operator will need to access the space within the reticular frame. However, this space is limited, inter alia due to the presence of the quill and tools. Similar problems appear to occur when accessing the workpiece carrier for replacing workpieces, or for replacing the workpiece carrier itself, or parts thereof.

WO-2012/156541-A1 discloses a machine tool in which one or more laterally displaceable tool carriers are provided, that can be laterally displaced between an operative position in which they are facing a workpiece carrier so that the workpieces can be machined using the tools carried by the tool carrier, and an inoperative position in which they are not facing the workpiece carrier and in which operations such that change of tools can be carried out easily and comfortably. However, it has been found that a drawback with the solution taught in WO-2012/156541-A1 is that the fixed orientation of the workpiece carrier and the workpieces in relation to the tools implies that in many cases, the machine can only carry out a limited number of operations on the workpieces. It has also been found that it could be desirable to provide an alternative layout, for increased flexibility, for example, when incorporating a machine for machining connecting rods into a system for the manufacture of connecting rods, for example, at the premises of a manufacturer of motor components, motors or vehicles.

EP-1642673-A1 teaches a machine tool in which a plurality of spindles are fixed on a stationary frame structure. A workpiece carrier is arranged to be displaced translationally along different axes, and additionally arranged for rotation so as to position the workpiece in relation to the tools. The structure is simple, but a disadvantage is that the fixed positions of the spindles tend to render the change of tools and maintenance operations rather difficult. Also, the structure of the mechanism for displacing the workpiece carrier is rather complex.

Obviously, many specific machine tool arrangements are known in the art, often for carrying out very specific operations. For example, STADTFELD H. J.: "DIE ZWEITE REVOLUTION IM VERZAHNEN VON KEGELRÄDERN", WERKSTATT UND BETRIEB, CARL HANSER VERLAG GMBH&CO. KG, DE, vol. 136, no. 6, 1 Jun. 2003, pages 10-14, 16 & 18, ISSN 0043-2792, discloses various machine tool arrangements for the machining of conical gear wheels, with workpiece carriers and tool carriers that are displaceable in relation to each other, the workpiece carrier being arranged to rotate the workpiece around its axis of symmetry.

EP-1201347-A2 discloses a compound machining apparatus with cutting and welding tools, the apparatus including linearly displaceable tool and workpiece carriers, including a rotatably arranged table for the workpiece.

JP-H06-134601-A and DE-202010008327-U1 disclose further examples of machine tools with linearly displaceable tool and workpiece carriers and including means for rotating a workpiece.

SUMMARY

A first aspect of the disclosure relates to a machine tool, comprising:

at least one workpiece carrier assembly (for example, a structurally stable, resistant and/or rigid one) including a workpiece carrier for supporting (such as holding) at least one workpiece. The workpiece carrier assembly can be, for example, a structure such as a metal structure arranged to provide for sufficient stability and rigidity to substantially avoid undesired movement of the workpiece carrier and the workpieces during machining; in some embodiments of the disclosure the workpiece carrier is arranged for supporting one single workpiece, and in other embodiments of the disclosure the workpiece carrier is arranged for supporting a plurality of workpieces, for example, 2 or more workpieces, such as 4-8 workpieces or more. In some embodiments of the disclosure, the workpieces are distributed over different workpiece support areas, such as over different surface areas, of the workpiece carrier. In some embodiments of the disclosure, each workpiece support area can accommodate a plurality of workpieces, such as 2 or more workpieces, such as 4-8 or more workpieces, for example, so as to allow for simultaneous machining of a plurality of workpieces.

The machine tool further comprises at least one workpiece carrier support, the workpiece carrier assembly being supported on the workpiece carrier support for horizontal movement in a first direction on the workpiece carrier support (for example, on one or more rails forming part of said workpiece carrier support), said first direction being parallel with a horizontal X axis.

The machine tool further comprises at least one tool carrier configured for carrying at least one tool for machining at least one workpiece by rotating said tool. The tool carrier can typically incorporate one or more spindles and spindle heads arranged to rotate one or more tools, as known in the art. In some embodiments of the disclosure, the tool carrier is configured for carrying a plurality of tools, for example, arranged in one or more horizontal rows. For example, in some embodiments of the disclosure, the tools in one or more rows can be arranged for simultaneously operating on different workpieces during at least one or more of the stages of machining that are to be carried out by the machine tool, when machining a set of workpieces.

The machine tool further comprises at least one tool carrier support, said tool carrier being supported on said tool carrier support for horizontal movement in a second direction on said tool carrier support (for example, on one or more rails forming part of said tool carrier support), said second direction being parallel with a horizontal Z axis, perpendicular to said horizontal X axis.

That is, for example, the tool carrier can be considered to be moveable backwards and forwards along the tool carrier support, in parallel with the Z axis (that is, in some embodiments of the disclosure, in parallel with the axes of the spindles for rotating the tools), whereas the workpiece carrier assembly can be considered to be moveable in a lateral direction along the workpiece carrier support.

The workpiece carrier assembly is being displaceable on said workpiece carrier support in said first direction parallel with the X axis between an operative position in which said workpiece carrier is facing said tool carrier (that is, facing it along said Z axis), and at least one inoperative position in which said workpiece carrier is not facing said tool carrier.

The workpiece carrier is arranged to be rotatable (or pivotable, or tiltable; that is, the term "rotatable" is not to be interpreted to require it to be able to turn 360 degrees; however, preferably, the workpiece carrier can rotate at least 90 degrees, more preferably at least 180 degrees or more, such as 360 degrees; however, in some embodiments of the disclosure, the workpiece carrier is only pivotable or tiltable to a lesser extent, for example, less than 90 degrees, such as less than 60 degrees or even less than 30 degrees) around the X axis, to allow for a modification of the angular position of the workpiece in relation to the tool carrier and, thus, in relation to the axes of the tools.

This arrangement provides for the important advantage that the workpiece carrier assembly with the workpiece carrier is displaceable so that, for example, when there is a need to access the tool carrier from the front, for example, for exchanging tools or for carrying out certain operations such as maintenance, the operator can access the tools and spindles from the front, without any need for entering the space between tool carrier and workpiece carrier. This provides for enhanced comfort and ergonomically favorable conditions, reduces the time needed for the operations, and allows for a rather compact arrangement without renouncing on ergonomics. For example, when the workpiece carrier assembly is in the non-operative position, the tool carrier can be displaced along the Z axis to occupy a position, such as one overlapping with the one that is occupied by the workpiece carrier during machining, and in which the tools are readily accessible from a side or end of the machine tool that can be regarded as a front side or end of the machine tool, for example, so that the tools are adjacent to and facing, for example, a door in an enclosure of the machine, which when open allows for simple changing of the tools and, when closed, provides for security during machining by preventing access to the area in which machining is taking place.

Additionally, due to the fact that the workpiece carrier can be rotated or pivoted around the X axis, that is, the axis along which the workpiece carrier moves, the angle of attack between the tools and the spindles on the one hand and the workpiece on the other, that is, the angular orientation of the workpiece in relation to the tools and tool carrier, can be modified, thereby allowing for more flexibility in what regards the operations that the machine can carry out. That is, the machine can be used for carrying out a large number of operations, including operations requiring different angular orientations between the workpiece and the tool, without any need for, for example, modifying the way in which the workpiece is supported, held or retained in the workpiece carrier. In the case of a connecting rod, sometimes this arrangement can make it possible to carry out all of the machining operations, or at least most of them, without moving the workpiece from the workpiece carrier, and using a rather low number of tools. For example, the rod blanks can be arranged so that the orientation of their longitudinal axes in the plane perpendicular to the X axis can be modified by rotating the workpiece carrier with regard to the X axis. This can, for example, allow for machining with different angles of attack (such as represented by, for example, FIGS. 1A and 1D on the one hand and FIG. 1C on the other), without having to modify the orientation of the tools and without rearranging the workpieces in the workpiece carrier.

The possibility of rotation or pivotation with regard to the X axis implies an additional advantage: the workpiece carrier can be pivoted or rotated around the X axis not only to modify the angle of attack between tool and workpiece, but also to turn the workpiece between a position where it is facing the tool carrier and the tools so as to allow for machining of the workpiece, and a position in which it is not facing the tool carrier, to provide for easy unloading and loading of workpieces.

In some embodiments of the disclosure, when the workpiece carrier assembly is in the inoperative position, the tool carrier is displaceable to a tool change position overlapping with the position in which the workpiece carrier is placed when the workpiece carrier assembly is in the operative position. That is, when moving to the inoperative position, the workpiece carrier assembly removes the workpiece carrier from a position facing the tool carrier along the Z axis, thereby allowing the tool carrier to occupy the space left free, that is, allowing the tool carrier to move forward along the Z axis to a position overlapping with the one previously occupied by the workpiece carrier. In some embodiments of the disclosure, when the tool carrier is in said tool change position, the tool carrier is situated adjacent to and facing, along the Z axis, an opening in an enclosure or wall of the machine tool. The machine tool may include a door in said opening of the enclosure; the door can be closed during machining and opened when the tool carrier is in the tool change position, to allow exchange of tools to take place through said door.

A second aspect of the disclosure relates to a machine tool, comprising:

a workpiece carrier assembly including a workpiece carrier for supporting at least one workpiece;

a workpiece carrier support, the workpiece carrier assembly being supported on the workpiece carrier support for horizontal movement in a first direction on the workpiece carrier support, said first direction being parallel with a horizontal Z axis;

a tool carrier configured for carrying at least one tool for machining at least one workpiece;

a tool carrier support, said tool carrier being supported on said tool carrier support for horizontal movement in a second direction on said tool carrier support, said second direction being a direction in parallel with a horizontal X axis, perpendicular to said horizontal Z axis (that is, for example, the tool carrier can be considered to be moveable towards the left and right along the tool carrier support, in many embodiments perpendicularly to the axes of the spindles for rotating the tools, whereas the workpiece carrier assembly can be considered to be moveable forwards and backwards along the workpiece carrier support);

said tool carrier being displaceable on said tool carrier support in said second direction (in parallel with the horizontal X axis) between an operative position in which said workpiece carrier is facing said tool carrier (that is, facing it along said Z axis), and at least one inoperative position in which said workpiece carrier is not facing said tool carrier;

and wherein the workpiece carrier is arranged to be rotatable (or pivotable, or tiltable) around the X axis, to allow for a modification of the angular position of the workpiece in relation to the tool carrier and, thus, in relation to the tools and spindles.

What has been indicated in relation to the first aspect of the disclosure applies also to this second aspect of the disclosure, mutatis mutandis.

In some embodiments of the disclosure, the machine tool comprises at least one additional tool carrier configured for carrying at least one tool for machining at least one workpiece by rotating said tool. In these embodiments of the disclosure, each of said tool carriers can be displaceable on said tool carrier support in said second direction between an operative position in which the workpiece carrier is facing the respective tool carrier, and at least one inoperative position in which said workpiece carrier is not facing the respective tool carrier. Due to the presence of more than one tool carrier, the number of available tools or tool sets can be increased, without excessively increasing, for example, the height of the machine, or the number of different tools carried by each tool carrier. Thus, according to the operations to be performed on a given set of workpieces, and/or depending on the kind of workpiece on which the operations are to be carried out, a selected one of the tool carriers can be brought to the operative position, facing the workpiece carrier along the Z axis, whereas the other tool carrier can be brought to or remain idle in a non-operative position. In some embodiments of the disclosure, tools of one of the tool carriers can be used for part of the processing of one or more workpieces, and tools of the other one of the tool carriers can be used for another part of the processing of the same workpieces.

In some embodiments of the disclosures, maintenance operations or change of tools, etc., can be carried out on the tool carrier that is in the non-operative position, whereas machining operations can be performed with the tools of the other tool carrier.

In the two aspects of the disclosure described above, the workpiece carrier comprises at least one workpiece support area for supporting said at least one workpiece, said workpiece support area being arranged, for example extending, in parallel or at least substantially in parallel with the X axis, and not perpendicular to the X axis. That is, the workpiece or workpieces are basically supported in a plane aligned with the X axis, rather than in a plane perpendicular to the X axis. This kind of arrangement can be practical in the case of, for example, the machining of workpieces for connecting rods. A workpiece can be reliably attached to the workpiece carrier in the workpiece support area, with a surface to be machined facing the tool carrier, whereby the rotation or pivotation or tilting of the workpiece carrier around an axis parallel with the X axis provides for different angles of attack, for example, so as to allow for an operation as per FIG. 1C before or after an operation as per FIG. 1A or 1D. When there are several workpieces arranged in a workpiece support area, some or all of them can be arranged one after the other in a row extending along the X axis. In many embodiments of the disclosure, it can be preferred that the workpieces be arranged with their longitudinal axes extending perpendicularly to the X axis, and if there are several workpieces in one workpiece support area, the workpieces—or at least some of them-can be arranged one beside the other, in a row extending in parallel with the X axis. For example, when the workpiece is a workpiece for producing a connecting rod, this kind of arrangement allows the machine to easily switch between different angles of attack, so as, for example, carry out an operation such as the one illustrated in FIG. 1C, before or after carrying out one or more of the operations illustrated in FIGS. 1A and 1D. Thus, this kind of arrangement has been found to be appropriate for the machining of, for example, connecting rods. In some embodiments of the disclosure, several workpieces can be machined simultaneously by corresponding tools arranged in parallel on the tool carrier.

Also, the arrangement of the workpiece support area substantially in parallel with the X axis can facilitate transport of the workpieces between a station for loading and unloading workpieces in the workpiece carrier, and a station facing the tools, basically by rotating the workpiece carrier around the X axis.

In some embodiments of the disclosure, the workpiece carrier comprises at least two workpiece support areas or workpiece support surfaces, each of said workpiece support areas being arranged for supporting, such as holding and retaining, at least one workpiece, said workpiece support areas being placed so that by rotating or pivoting the workpiece carrier around said axis parallel with the X axis, one of said workpiece support areas can selectively be brought to a position for loading and unloading workpieces, whereas another one of said workpiece support areas can be brought to a position substantially facing the tool carrier, to allow for machining of the workpieces arranged in correspondence with said workpiece support area. That is, the workpiece support areas can be angularly distributed around the surface of the workpiece carrier, with regard to the X axis, for example, to allow workpieces to be unloaded and loaded while other workpieces are being machined.

In some embodiments of the disclosure, the workpiece carrier comprises more than two of said workpiece support areas, for example, 3, 4, 6, 8 or more of these workpiece support areas. This can involve additional advantages, for example, by providing for intermediate positions in addition to the position facing the tool carrier and the position for loading and unloading. For example, after machining of the workpiece or workpieces arranged in one of the workpiece support areas, this workpiece support area can be turned to a position facing downwards, thereby allowing removed metal chips to fall away from these workpieces while the workpieces in another workpiece support area are being machined. In some embodiments of the disclosure, the workpiece carrier can have a substantially polygonal configuration in the plane perpendicular to the X axis, each of the sides of the polygon representing a workpiece support area. In some embodiments of the disclosure, the polygon is a square, a hexagon or an octagon. In some embodiments of the disclosure, the polygon is chosen to have opposite sides parallel to each other.

In some embodiments of the disclosure, the tool carrier is configured for carrying said at least one tool for machining said at least one workpiece by rotating said tool around an axis parallel with said Z axis. In many embodiments in which the tool carrier is carrying several tools, all of the tools can be arranged for rotating in parallel with the Z axis; this can often be the preferred and most practical approach. In other embodiments of the disclosure, one or more tools, for example all of the tools, can be arranged for rotating with a different orientation, such as at a certain angle with regard to the Z axis.

With the workpiece or workpieces arranged in a workpiece support area arranged substantially parallel with the X axis, the tools arranged to rotate around an axis parallel with the Z axis can carry out, for example, operations of the type illustrated in FIGS. 1A, 1C and 1D, whereby switching between, for example, the operation illustrated in FIG. 1C and the one of FIG. 1A or 1D can include the above-mentioned rotation, pivotation or tilting of the workpiece carrier around an axis parallel with the X axis, so as to provide for the appropriate angle of attack between tool and workpiece.

In some embodiments of the disclosure, the machine tool further comprises an auxiliary support, which is stationary in some embodiments of the disclosure and non-stationary in other embodiments of the disclosure, for supporting the workpiece carrier. The workpiece carrier assembly and the auxiliary support are arranged so that at least one of them can be displaced towards the other one for interconnection/engagement between the workpiece carrier and the auxiliary support, and from the other one for disconnection/disengagement between the workpiece carrier and the auxiliary support, so as to allow the workpiece carrier to be supported also by the auxiliary support during machining, while being rotatable around said axis parallel with the X axis, supported between the workpiece carrier assembly and the auxiliary support.

That is, for example, the workpiece carrier assembly can be moved towards the auxiliary support, for example, in parallel with the X axis, so that the workpiece carrier engages with the auxiliary support, whereby the workpiece carrier can be rotatably supported also on the auxiliary support, that is, rotatably supported on two opposite sides of the workpiece carrier. This provides for enhanced support and can reduce the stresses and bending forces exerted on the workpiece carrier assembly (for example, due to the manner in which the workpiece carrier may project outwards from a side of a tower structure or similar of the workpiece carrier assembly), not only during machining (where the stresses tend to be at their maximum), but optionally also when the machine tool is to remain idle for a substantial period of time. In some embodiments of the disclosure, the auxiliary support and the workpiece carrier are provided with means for interconnection comprising a projecting member such as a pin (such as a pin having a circular cross section and extending along the X axis) and a recess, the projecting member being arranged to fit into the recess. For example, the workpiece carrier can comprise a recess arranged to receive a pin forming part of the auxiliary support, or vice-versa. The pin can have a length and the recess can have a depth sufficient to allow the workpiece carrier and the auxiliary support to be displaced in relation to each other, such as along the X axis, to a certain extent, for example, by several centimeters, without the pin leaving the recess, so that the auxiliary support can continue supporting the workpiece carrier while the workpiece carrier is carrying out minor displacements along the X axis, for example, to modify the position between the workpieces and the tools in the direction along the X axis.

The auxiliary support can comprise some kind of vertically moveable sledge on which the corresponding means for interconnection are arranged, so that they can be displaced vertically, in synchronism with vertical movement of the workpiece carrier in the workpiece carrier assembly.

In some embodiments of the disclosure, the workpiece carrier comprises means for holding workpieces, said means for holding workpieces being mounted on rotatable or pivotable supports for rotating or pivoting the workpieces with regard to an axis perpendicular to the X axis of the system. This can further increase the versatility of the machine and the number of machining operations that can be carried out, using a given set of tools and a given tool carrier.

In some embodiments of the disclosure, the workpiece carrier support and the tool carrier support together have an L configuration, when viewed from above. That is, the workpiece carrier support and the tool carrier support can extend substantially perpendicularly to each other.

In some embodiments of the disclosure, the workpiece carrier is mounted on the workpiece carrier assembly so that the workpiece carrier is displaceable in the vertical direction, that is, parallel with a Y axis of the system, perpendicular to the X and Z axes.

In some embodiments of the disclosure, all of the tools, when mounted in the tool carrier, are placed at a height of not less than 0.7 m, preferably not less than 1.1 m, and not more than 1.8 m, preferably not more than 1.5 m, over a floor, said floor being a floor on which an operator walks when servicing the machine tool. In this way, the operator can manipulate the tools while adopting a comfortable and ergonomically correct position, and without any need for climbing ladders or similar. In other embodiments of the disclosure, at least some tools may be arranged higher above the floor, which may sometimes be a disadvantage from an ergonomical point of view, but an advantage due to enhanced versatility, for example, due to an increased number of tools.

In some embodiments of the disclosure, the tool carrier comprises N rows of tools, $1 \leq N \leq 8$, N preferably being 2, 3 or 4. By using a rather low number of rows, all of the tools can be kept at a height that allows for easy manipulation of the tools by an operator. Also, each row can contain a rather low number of tools or tool spindles, such as two, three, four or five. For example, connecting rods can sometimes be machined using a rather low number of different tools, especially when the angle of attack can be changed by pivoting the workpiece carrier, as the same tool can sometimes be used to carry out several different operations, under different angles of attack. This reduces the number of tools that need to be used, and ensures that all the tools can be placed within a limited space, at an adequate height to facilitate maintenance work and change of tools. In other embodiments of the disclosure, a larger number of rows of tools can be used, and/or a larger number of tools per row can be used, for example, in order to allow for the simultaneous machining of several workpieces, such as 2, 3, 4, 5, 6, 7, 8 or more workpieces, such as 16 or 24 workpieces, with a corresponding number of tools (or, in some embodiments, with an even higher number of tools, as sometimes more than one tool can be used for simultaneous machining of one workpiece).

In some embodiments of the disclosure, the workpiece carrier support and the tool carrier support are placed on a floor and arranged to support the workpiece carrier assembly and the tool carrier, respectively, from below. It can sometimes be preferred that none of the tool carrier or the workpiece carrier assembly hang from overhead supports; the use of simple ground supports placed on the floor can be preferred, for example, due to simplicity of installation and/or easy maintenance.

In some embodiments of the disclosure, the workpiece carrier support and the tool carrier support have a height of not more than 1.1 m, preferably not more than 0.6 m. In this way, the tool carrier and workpiece carrier can be placed at a relatively low height, facilitating access to the tools.

In some embodiments of the disclosure, the at least one workpiece is a workpiece for producing a connecting rod, that is, a workpiece which is to be treated, including machined, so as to form a connecting rod for connecting the piston to the crankshaft in a reciprocating piston engine, such as a reciprocating piston engine of an automobile or a truck. That is, the machine can be adapted or configured for holding this kind of workpiece. More specifically, the workpiece carrier can be adapted/configured for supporting or holding one or more workpieces for producing connecting rods.

Another aspect of the disclosure relates to a method for machining workpieces, such as workpieces for connecting rods for a reciprocating piston engine, such a reciprocating piston engine of an automobile or a truck. The method comprises subjecting a blank, such as a rod blank, to a plurality of machining steps, wherein a plurality of said machining steps are carried out by a machine tool as described above, and wherein the workpiece carrier is rotated or pivoted or tilted around an axis parallel with the X axis between at least two of said machining steps.

BRIEF DESCRIPTION OF THE DRAWINGS

To complete the description and in order to provide for a better understanding of the disclosure, a set of drawings is provided. Said drawings form an integral part of the description and illustrate embodiments of the disclosure, which should not be interpreted as restricting the scope of the disclosure, but just as examples of how the disclosure can be carried out. The drawings comprise the following figures:

FIGS. 1A-1D schematically illustrate some operations which can be carried out when machining a connecting rod out of a rod blank, involving the use of different tools;

DETAILED DESCRIPTION OF THE DISCLOSURE

Figure 2:
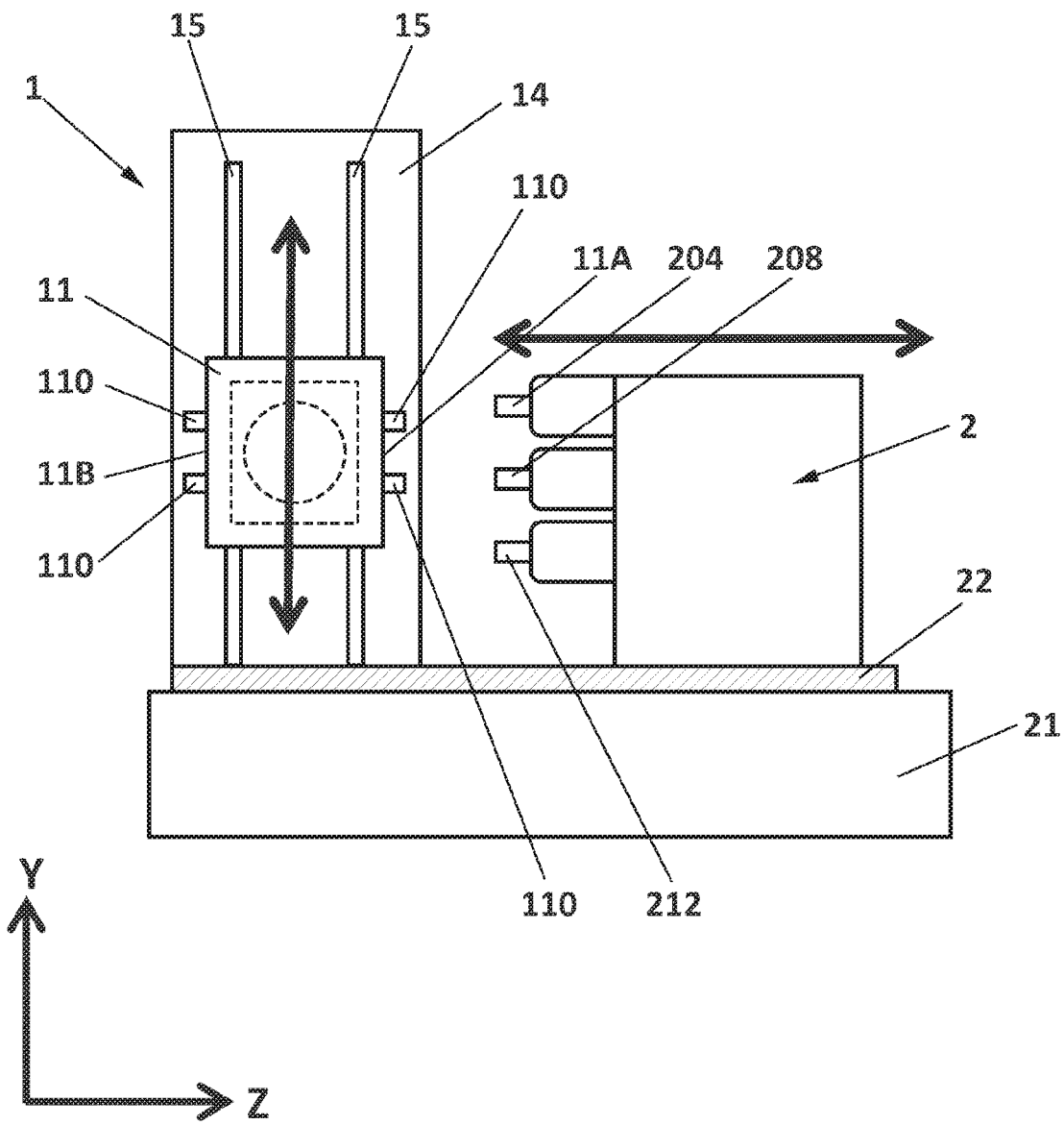
FIG. 2 is a side view of a machine tool according to one possible embodiment of the disclosure.

FIG. 2 shows a machine tool according to one possible embodiment of the disclosure, from the side, that is, viewed in parallel with a horizontal X axis perpendicular to the horizontal Z axis and the vertical Y axis of the system. The machine tool comprises a tool carrier 2, such as a tool carrier carriage, moveable on rails 22 (one of which is shown in FIG. 2) or other suitable guide means, forming part of a tool carrier support 21. The movement of the tool carrier 2 is in the horizontal direction, in parallel with the Z axis of the system. The movement can be generated by a computer controlled drive system using one or more servomotors or other drive means (the drive means are not illustrated in FIG. 2). The tool carrier can comprise spindles and spindle heads, as known in the art, to rotate corresponding tools 204, 208, 212 around their axis of rotation, parallel with the Z axis. The operation of the tools can be computer controlled. In some embodiments of the disclosure, the individual tools can be arranged to be individually displaceable, for example, under the control of a computer, in parallel with the Z axis, so as to act on a corresponding workpiece. In other embodiments of the disclosure, the tools are fixed in relation to the tool carrier, so that the entire tool carrier has to be displaced to move the tool in relation to the workpiece, along the Z axis. In some embodiments of the disclosure, one or more of the tools can be arranged to rotate around an axis not parallel with the Z axis.

In the embodiment of the disclosure illustrated in FIG. 2, the tool carrier is arranged to hold a plurality of different tools, and arranged to operate so that during machining of one workpiece, different tools are applied to the workpiece to carry out different machining operations, simultaneously or at different stages of the process. In some embodiments of the disclosure, at one or more stages of the process more than one tool can be applied to a workpiece simultaneously, and/or a plurality of workpieces can be machined simultaneously, such as in parallel with each other.

The machine tool further comprises a workpiece carrier assembly 1 including a workpiece carrier 11 including means 110 for holding workpieces. These means 110 for holding workpieces are arranged on two opposite surfaces or workpiece support areas 11A and 11B of the workpiece carrier. In the state of the machine tool illustrated in FIG. 2, one of these workpiece support areas 11A is facing the tool carrier 2 along the Z axis of the system, and the other of these workpiece support areas 11B is facing in the opposite direction. Thus, in this state of the machine, and when the workpiece carrier is placed in front of the tool carrier 2 along the Z axis, the tools of the tool carrier can act on the workpieces supported in correspondence with workpiece support area 11A, whereas already machined workpieces can be unloaded and workpieces to be machined can be loaded in correspondence with the workpiece support area 11B. That is, machining of the workpieces at one of the two workpiece support areas can take place while unloading and loading is taking place at the opposite workpiece support area.

In the illustrated embodiments, two workpieces can be arranged in each of the two support areas 11A and 11B; the workpieces can be arranged vertically, one beside other. However, in other embodiments of the disclosure, they can be arranged horizontally, or in any other suitable orientation. In some embodiments of the disclosure, the workpiece carrier is arranged for holding only one single workpiece in each workpiece support area. In some embodiments of the disclosure, the number of workpieces in each workpiece support area matches the number of tools in the tool carrier, or the number of tools in a row of tools in the tool carrier. In some embodiments of the disclosure, there is only one area provided for holding workpieces, and machining has to be interrupted during loading and unloading.

The workpiece carrier is arranged on a carriage 13 (not shown but marked as a square with dotted lines in FIG. 2; illustrated in FIGS. 3A-3C) which is displaceable along the vertical Y axis, on a tower structure 14, for example, along rails 15, driven by one or more computer controlled servomotors or other suitable drive means. On the other hand, this tower structure 14 is arranged to be displaced along the horizontal X axis, perpendicular to the horizontal Z axis, on horizontal rails 16 (shown in FIGS. 3A-3C) forming part of the workpiece carrier support 12. The tower structure 14 can be driven in parallel with/along the X axis by one or more computer controlled servomotors, or other suitable drive means.

Figure 3A:
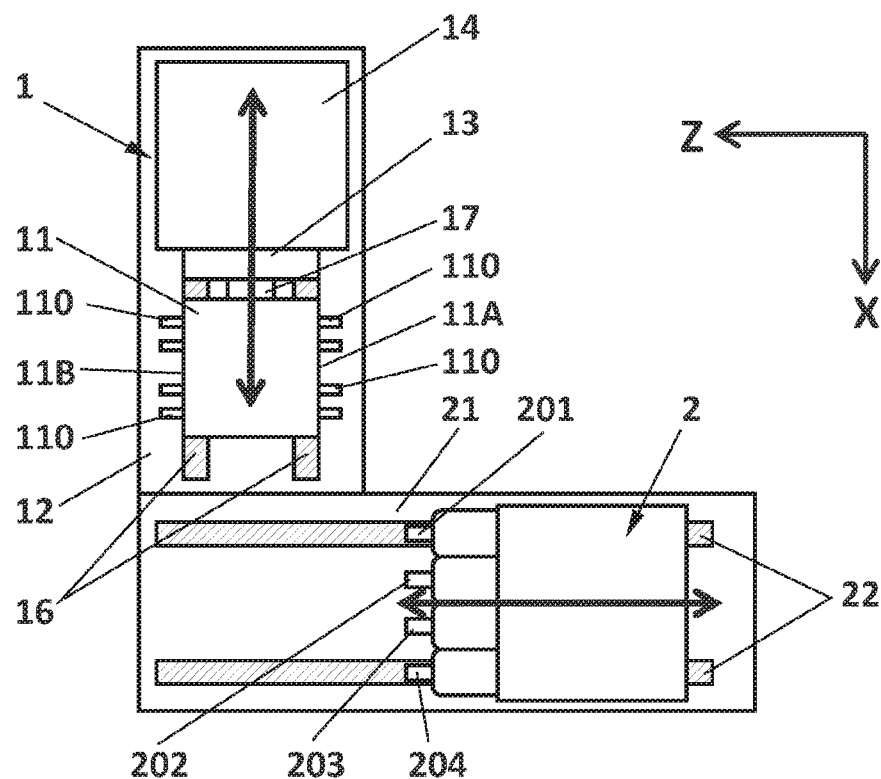
FIGS. 3A-3C are top views of the machine tool in accordance with said embodiment of the disclosure, in three different states.
Figure 3B:
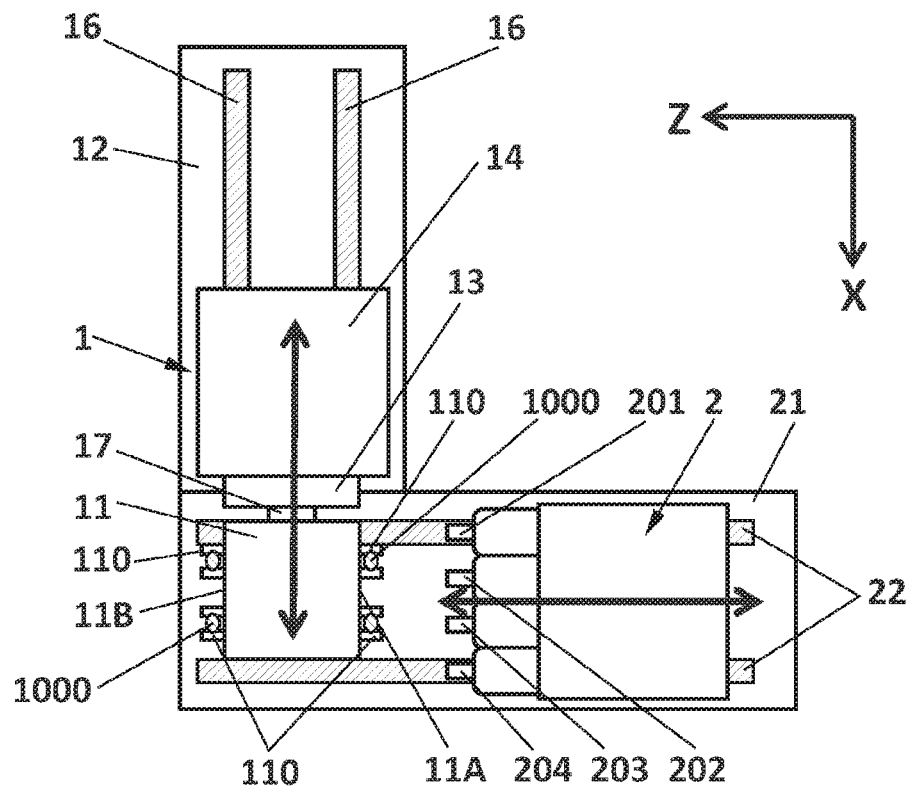
Figure 3C:
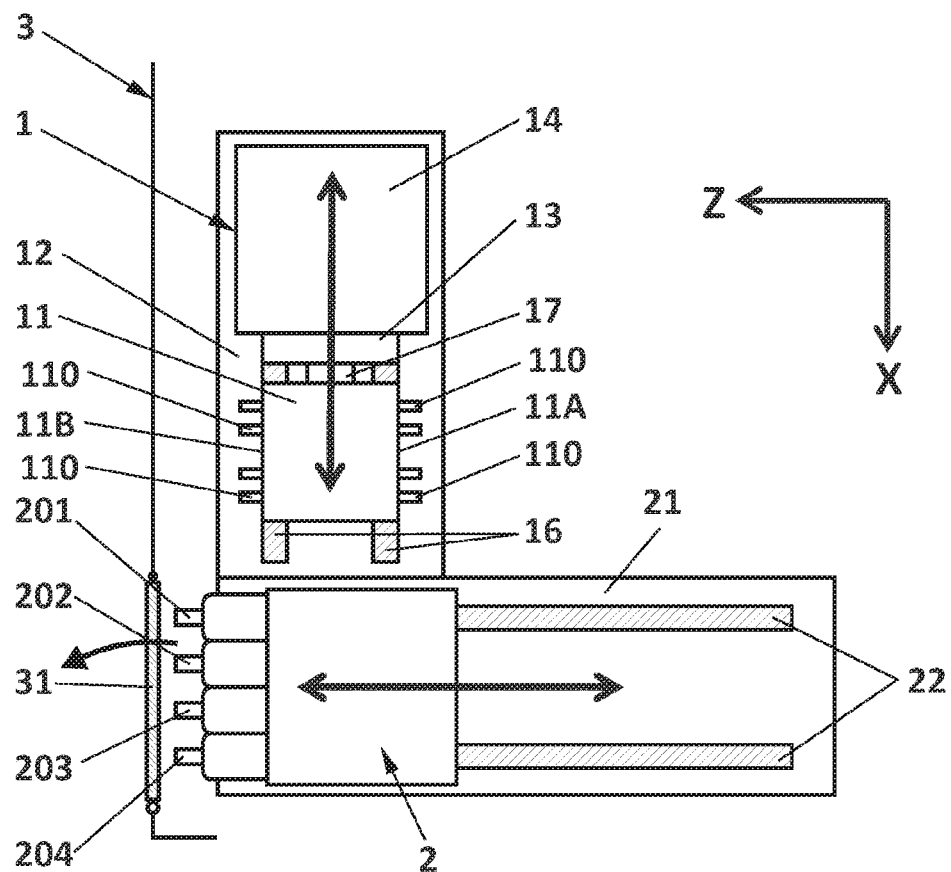

In FIGS. 2 and 3A-3C, arrows indicate the directions in which the tool carrier 2, workpiece carrier 11 and workpiece carrier assembly 1 (including the tower structure 14) are displaceable by the (not illustrated) drive means. On the other hand, and as schematically illustrated in FIG. 2, the workpiece carrier 11 is joined to the vertically displaceable carriage 13 by a shaft 17 (illustrated in FIGS. 3A-3C) or other means of interconnection between the workpiece carrier and the carriage, so as to allow for controlled tilting, pivotation or rotation of the workpiece carrier, around the X axis. That is, the workpiece carrier 11 is connected to the carriage 13 by means 17 that allow for controlled tilting, pivotation or rotation of the workpiece carrier 11, around or with regard to the X axis. This movement can be carried out by one or more computer controlled servomotors, or by any other suitable controllable drive means. By means of this additional degree of freedom of movement, the workpiece or workpieces can be oriented so as to provide for a suitable angle of attack between tool and workpiece, and this angle can be modified during machining of a workpiece so that a sequence of different machining operations can be carried out on the workpiece, under different angles of attack, without modifying the orientation of the axes of the tools and without changing the position of the workpiece with regard to the workpiece carrier as such. That is, a wide range of operations can be carried out on the workpiece by moving the workpiece in parallel with the horizontal X axis (by displacing the tower structure 14 along the tracks 16), in parallel with the vertical Y axis (by displacing the carriage 13 along the tracks 15), and by tilting, pivoting or rotating the workpiece carrier 11 around the X axis (for example, by means of turning the shaft 17 around its longitudinal axis), and by displacing individual tools and/or the entire tool carrier 2 in parallel with the Z axis, along the corresponding tracks 22. In FIGS. 3A-3C the shaft 17 is visible between the carriage 13 and the workpiece carrier 11, but this is just to illustrate the rotatable connection between the workpiece carrier 11 and the carriage 13; in many embodiments of the disclosure, the shaft will not be visible, and in other embodiments of the disclosure there is no such shaft, but the workpiece carrier is connected to the carriage 13 by other means that allow for rotation.

As illustrated in FIG. 2, the tools can be arranged at different heights in the tool carrier 2, for example, in several rows, and each row can include one or more tools. For example, in FIGS. 3A-3C an embodiment is shown where the top row of the tool carrier includes four tools.

Some of the tools may be different, in order to carry out different operations on a workpiece. In some embodiments of the disclosure, machining operations are arranged to take place on two or more workpieces simultaneously, at least at one or some of the stages of machining of the workpieces.

However, in some embodiments of the disclosure, only one workpiece is being machined at each moment. This can simplify the structure and programming of the machine tool, but also imply a lower production rate. In some embodiments of the disclosure, two or more operations can be carried out simultaneously on one workpiece or on each of a plurality of workpieces, that is, two or more tools can be operating simultaneously on a workpiece or on each of a plurality of workpieces. In some embodiments of the disclosure, each tool or at least some of the tools can be associated with drive means that allow for a longitudinal displacement of the tool in parallel with the Z axis, so that its position along the Z axis can be independent, at least to a certain extent, of the position along the Z axis of one or more of the other tools. This can serve to enhance flexibility and productivity. By displacing the workpiece in parallel with the X and Y axes, the workpiece can be displaced so that different tools can operate on different portions of the workpiece, and by rotating or tilting the workpiece assembly around the X axis, the angle of attack can be set in accordance with the operation to be performed. Thus, a very large number of different operations can be carried out, using different tools. In some embodiments of the disclosure, the tools are sufficiently spaced from each other (for example, in terms of the separation between different tools in a row and/or in terms of separation between rows) so that there is no undesired interference between tools and workpiece, that is, so that the workpiece can be brought into contact with a desired tool for carrying out a desired operation, without entering into contact with adjacent tools, even in the absence of any possibility of (individual) displacement of one tool with regard to the other tools, along the Z axis. In some embodiments of the disclosure, at least some tools are placed so close to each other that at least two tools can operate on the workpiece simultaneously.

FIGS. 3A-3C illustrate three different states of the machine tool of FIG. 2. In FIG. 3A, the workpiece carrier assembly 1 including tower structure 14, carriage 13, connecting means 17 and workpiece carrier 11 is placed in its inoperative position. The tool carrier 3 is placed away from the front end of the machine, that is, it is placed towards the rear of the tool carrier support 21, thereby allowing the workpiece carrier assembly 1 to move to its operative position, shown in FIG. 3B. In FIG. 3B, the workpiece carrier assembly is in its operative position, in which the workpiece carrier 11 faces the tool carrier 2 along the Z axis, thereby making it possible for the tools (the upper row of tools 201-204 being shown in FIG. 3B) to access the workpiece (or workpieces) 1000 held at the workpiece support area 11A, and to carry out machining operations in correspondence with predetermined positions of said workpiece and under predetermined angles of attack, by displacing the workpiece carrier along the X and Y axes and by tilting or rotating it around the X axis and, optionally, by displacing the tool carrier 2 and/or individual tools along the Z axis. At the same time, workpieces can be unloaded and/or loaded at the opposite workpiece support area 11B of the workpiece carrier 11.

FIG. 3C shows a third state of the machine tool, in which the workpiece carrier assembly 1 has returned to its inoperative position, allowing the tool carrier to move forward to occupy the space previously occupied by at least part of the workpiece carrier assembly 1 (for example, by the workpiece carrier 11), at the front end of the machine. Here, in a tool change position of the tool carrier, tools can be treated or exchanged and/or other maintenance operations can be carried out at the front end of the tool carrier 2, under ergonomically favorable conditions and without any need for the operator to squeeze in between tool carrier 12 and workpiece carrier 11. When in the tool change position, the tool carrier can be facing a door 31 in an enclosure 3 of the machine tool.

Figure 4A:
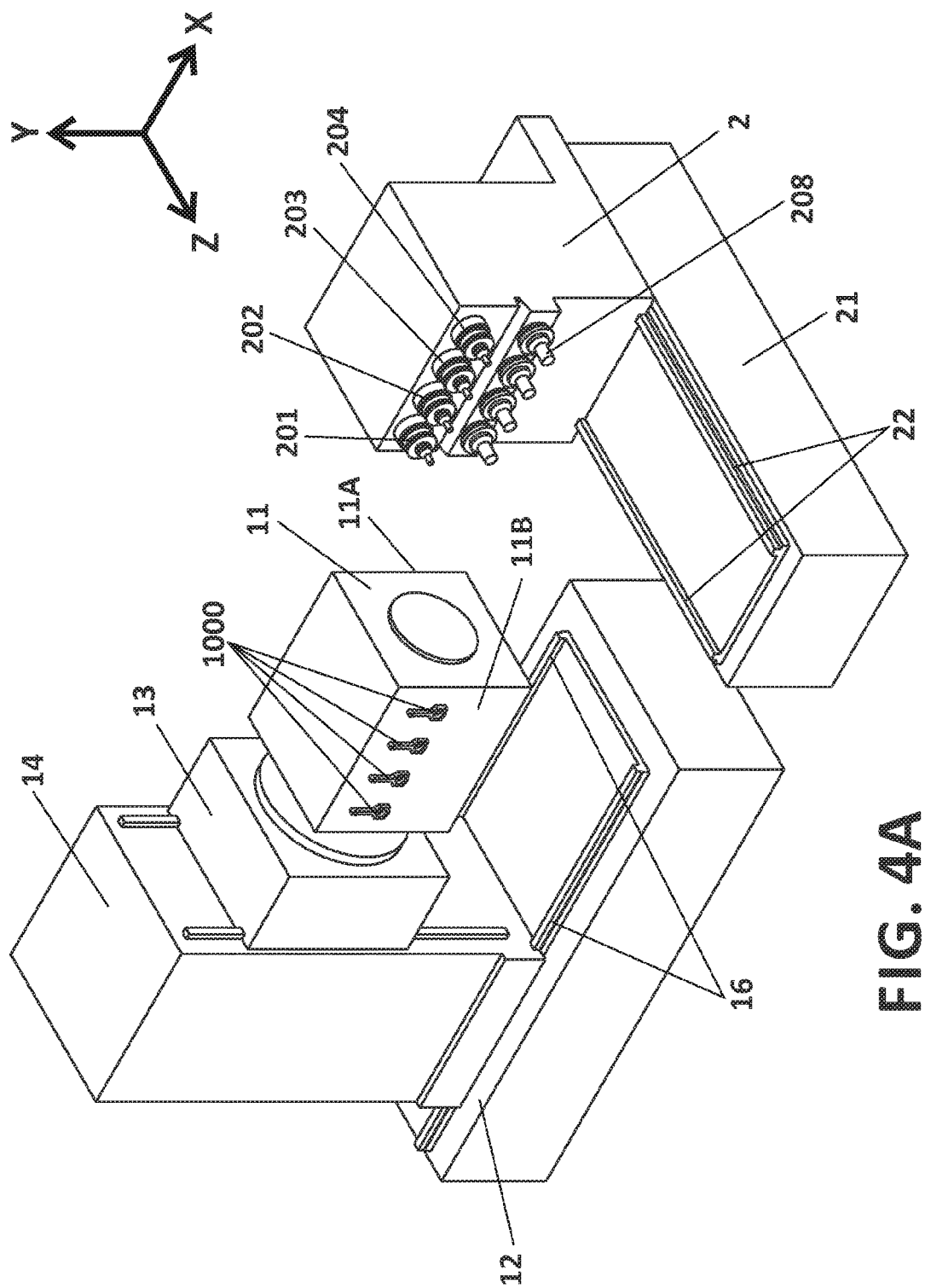
FIGS. 4A-4D are perspective views of a different embodiment, based on a general layout similar to the one of FIGS. 2-3C.
Figure 4B:
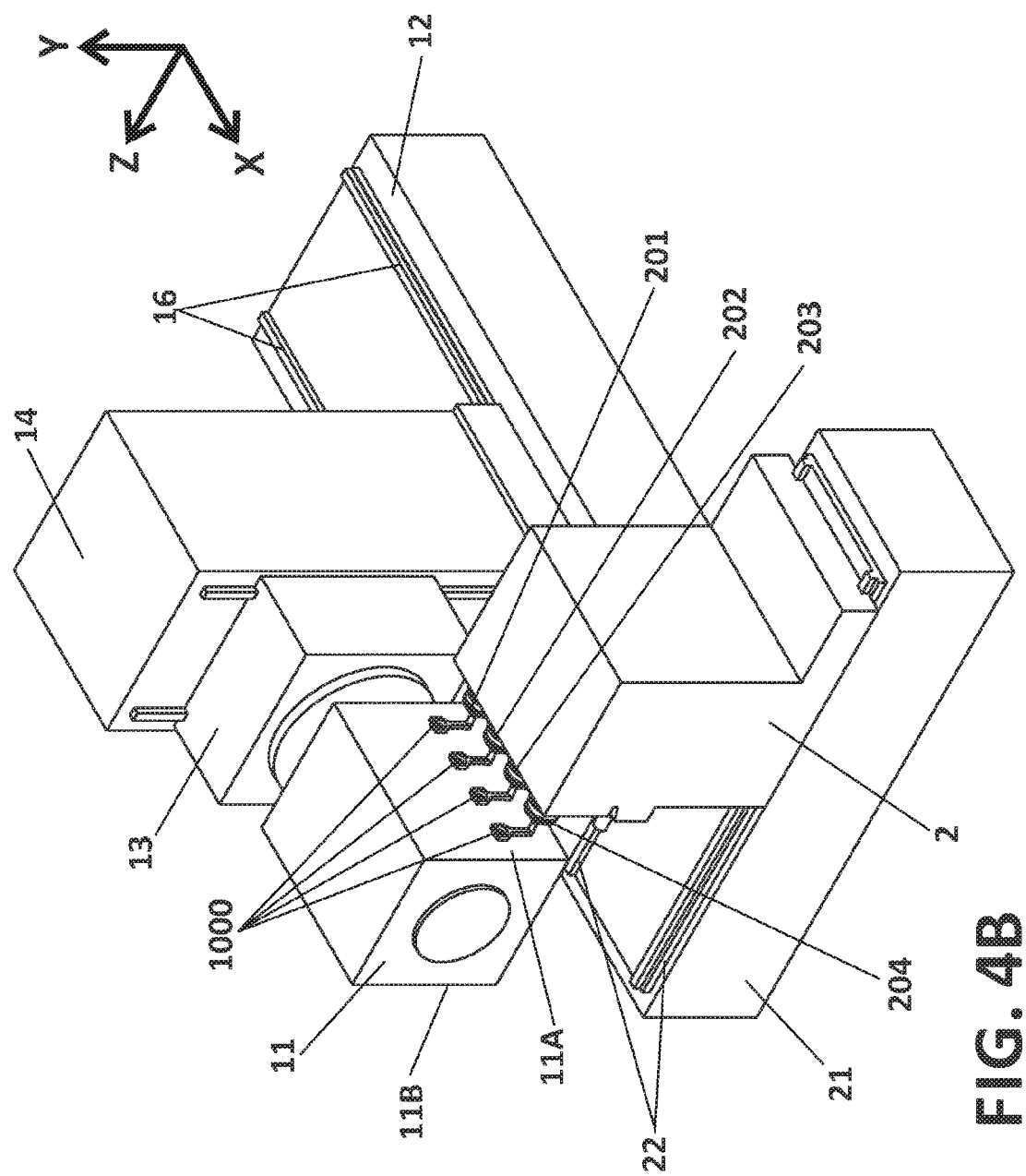
Figure 4C:
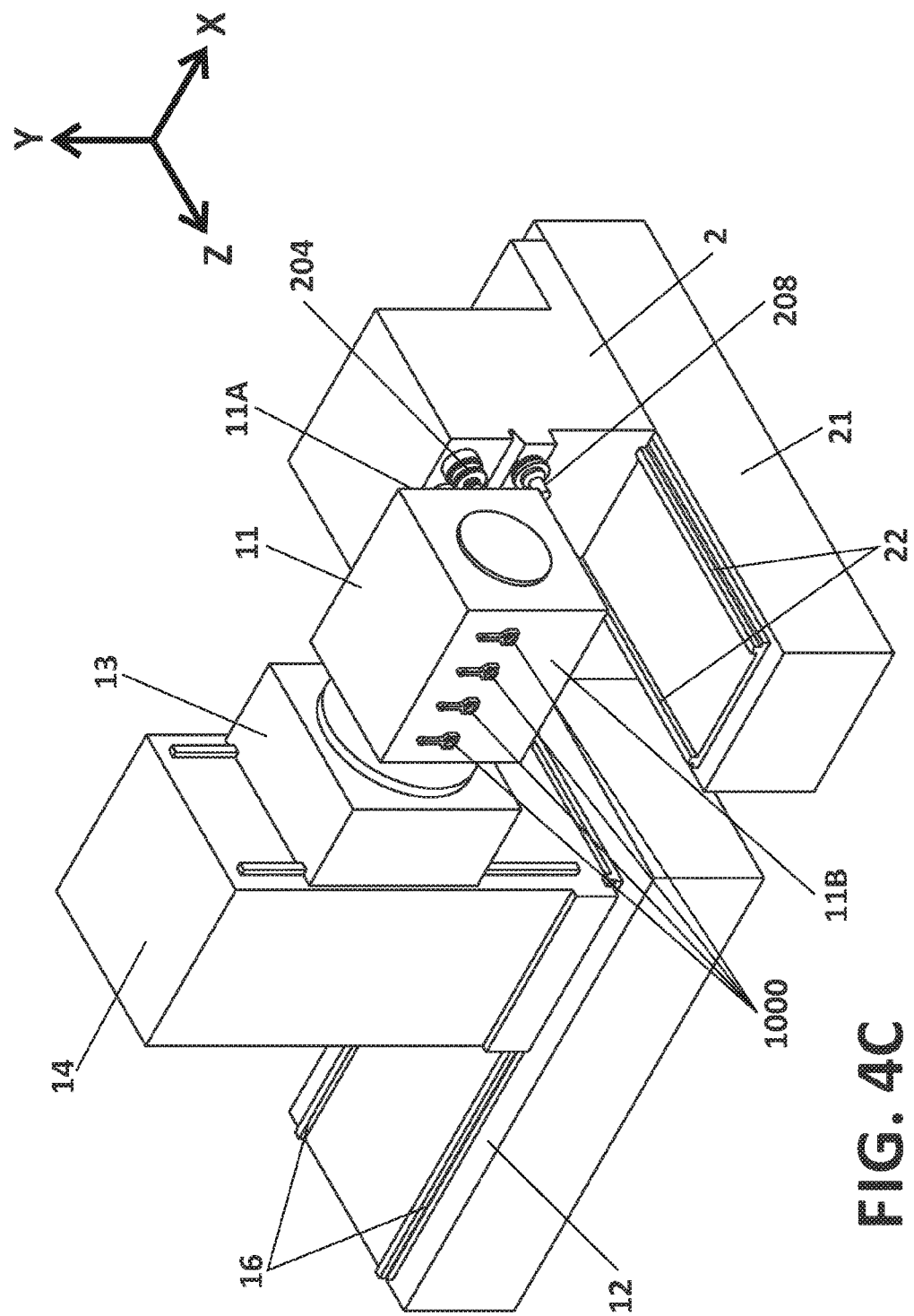
Figure 4D:
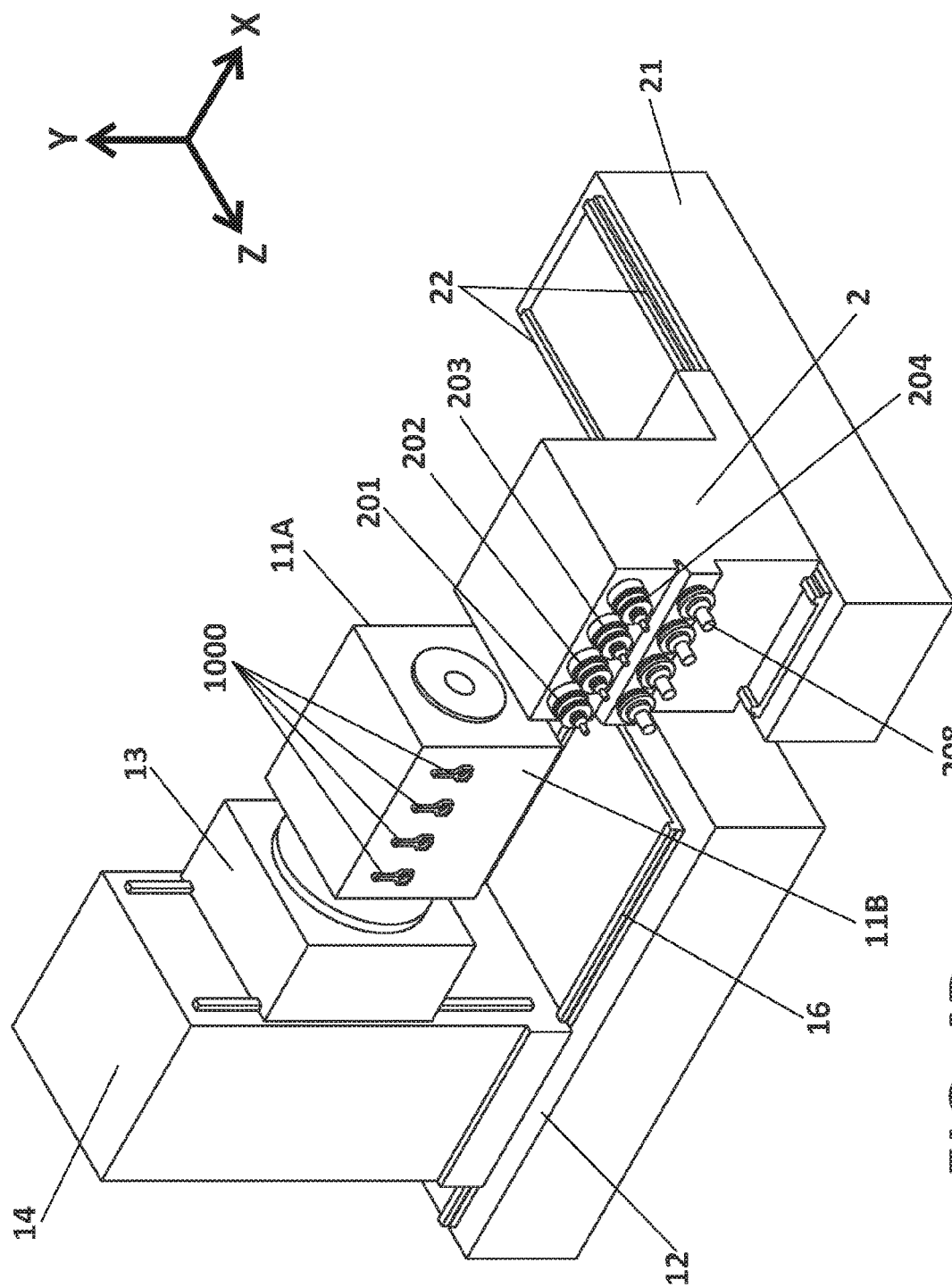

FIGS. 4A-4D schematically illustrate an alternative machine tool based on the general layout of FIGS. 2-3C. Here, the tool carrier features only two rows of tools. FIG. 4A illustrates the workpiece carrier assembly in the inoperative position. In this figure, one can see how the workpiece support area 11B extends in parallel with the X axis (the same is true for the opposite workpiece support area 11A, shown in FIG. 4B), and how four workpieces 1000 are arranged in the workpiece support area with their longitudinal axes perpendicular to the X axis, one workpiece beside the other in a row extending in parallel with the X axis. FIGS. 4B and 4C illustrate the machine tool from two different angles when the workpiece carrier assembly is in the operative position, so that the tools can interact with the workpieces. FIG. 4D illustrates the machine tool with the tool carrier in the tool change position.

Figure 5A:
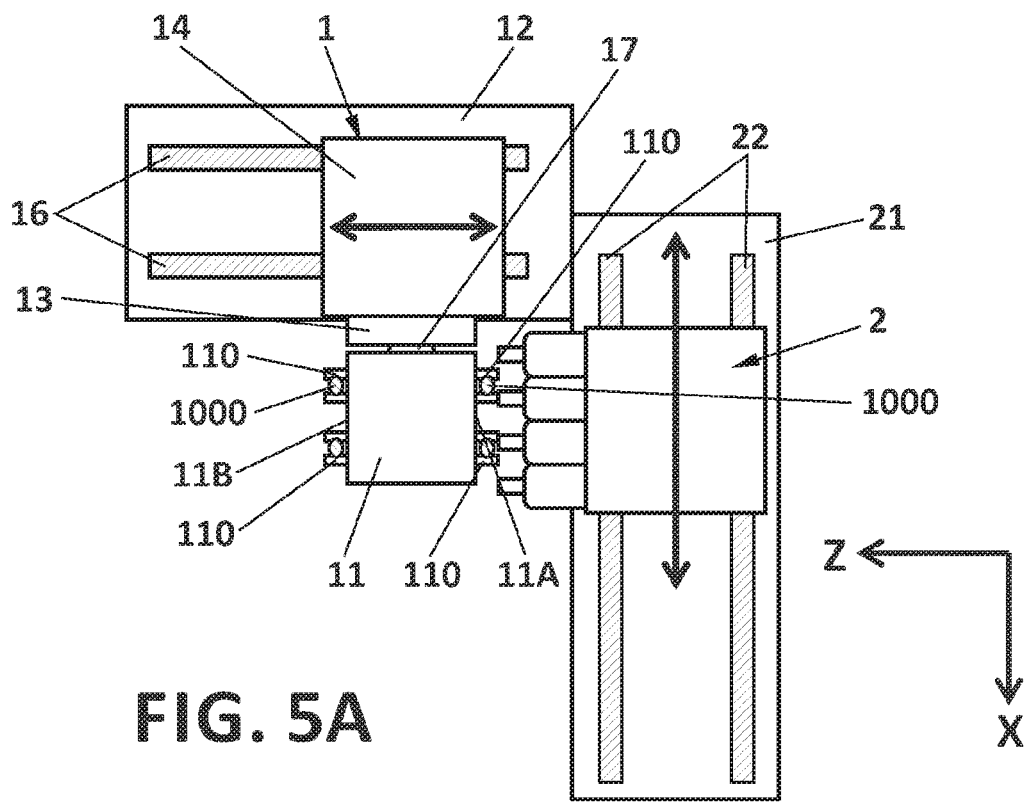
FIGS. 5A-5B are top views of the machine tool in accordance with another embodiment, in two different states.
Figure 5B:
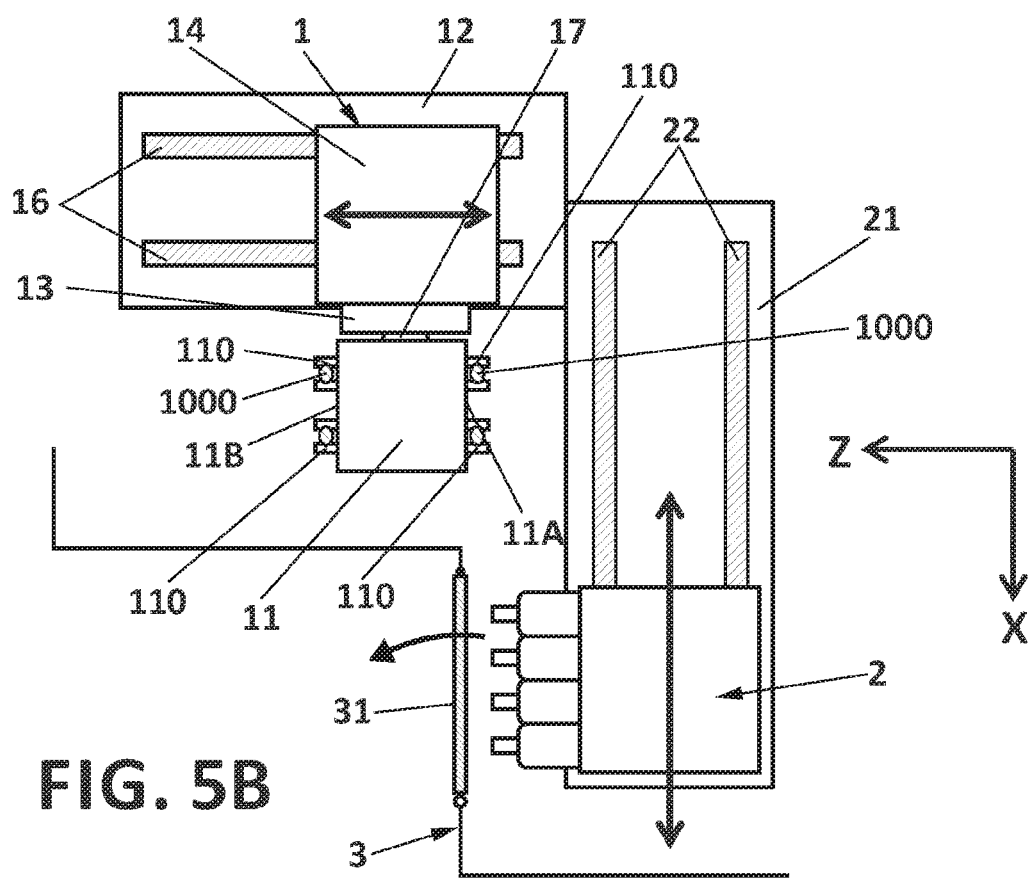

FIGS. 5A and 5B illustrate an alternative embodiment of the disclosure. The tool carrier 2 and the workpiece carrier assembly 1 are of the same type as those of the embodiment of FIGS. 2 and 3A-3C, but the way in which they are arranged to move is different. In this embodiment, the tool carrier is arranged to be displaced in parallel with the X axis, between an operative position (FIG. 5A) in which it faces the workpiece carrier so that the tools can act on the workpiece or workpieces carried at the support area 11A, and an inoperative position (FIG. 5B) in which the tool carrier 2 and the tools are no longer facing the workpiece carrier 11, thereby allowing access to the tools from the front side of the tool carrier (for example, through a door 31 in an enclosure 3 of the machine tool), without the operator having to enter the space between workpiece carrier and tools. For adapting the distance between workpieces and tools along the Z axis, the workpiece carrier assembly can be displaceable in parallel with the Z axis, and/or tools or groups of tools can be displaced in parallel with the Z axis. A large number of machining operations can thus be performed by displacing the tool carrier 2 in parallel with the X axis and by displacing the carriage 13 in parallel with the Y axis, by displacing tools and/or the workpiece carrier assembly 1 in parallel with the Z axis, and by tilting, rotating or pivoting the workpiece carrier 11 around an axis parallel with the X axis.

Figure 6A:
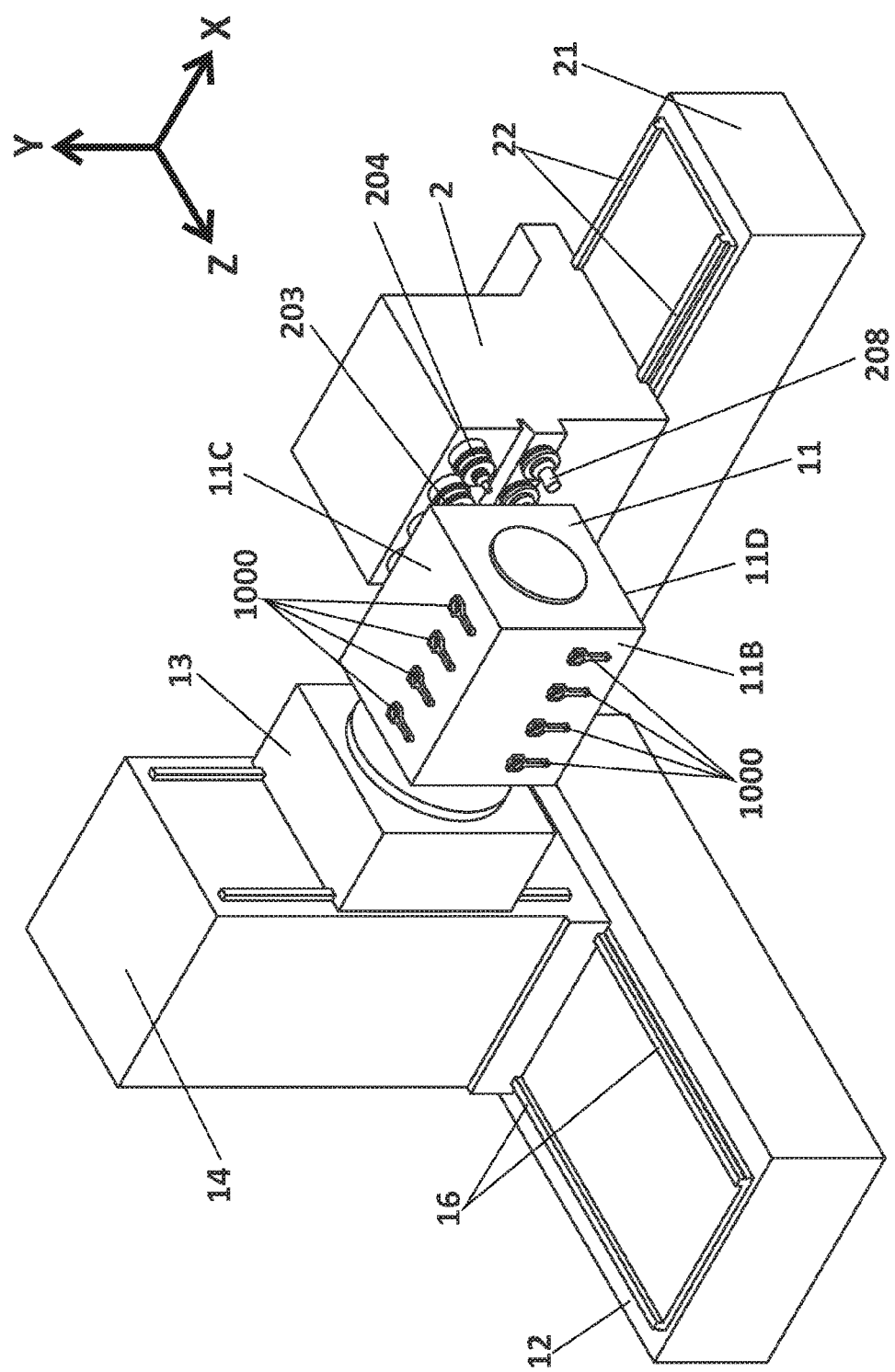
FIGS. 6A and 6B are perspective views of another embodiment, based on a general layout similar to the one of FIGS. 5A and 5B.
Figure 6B:
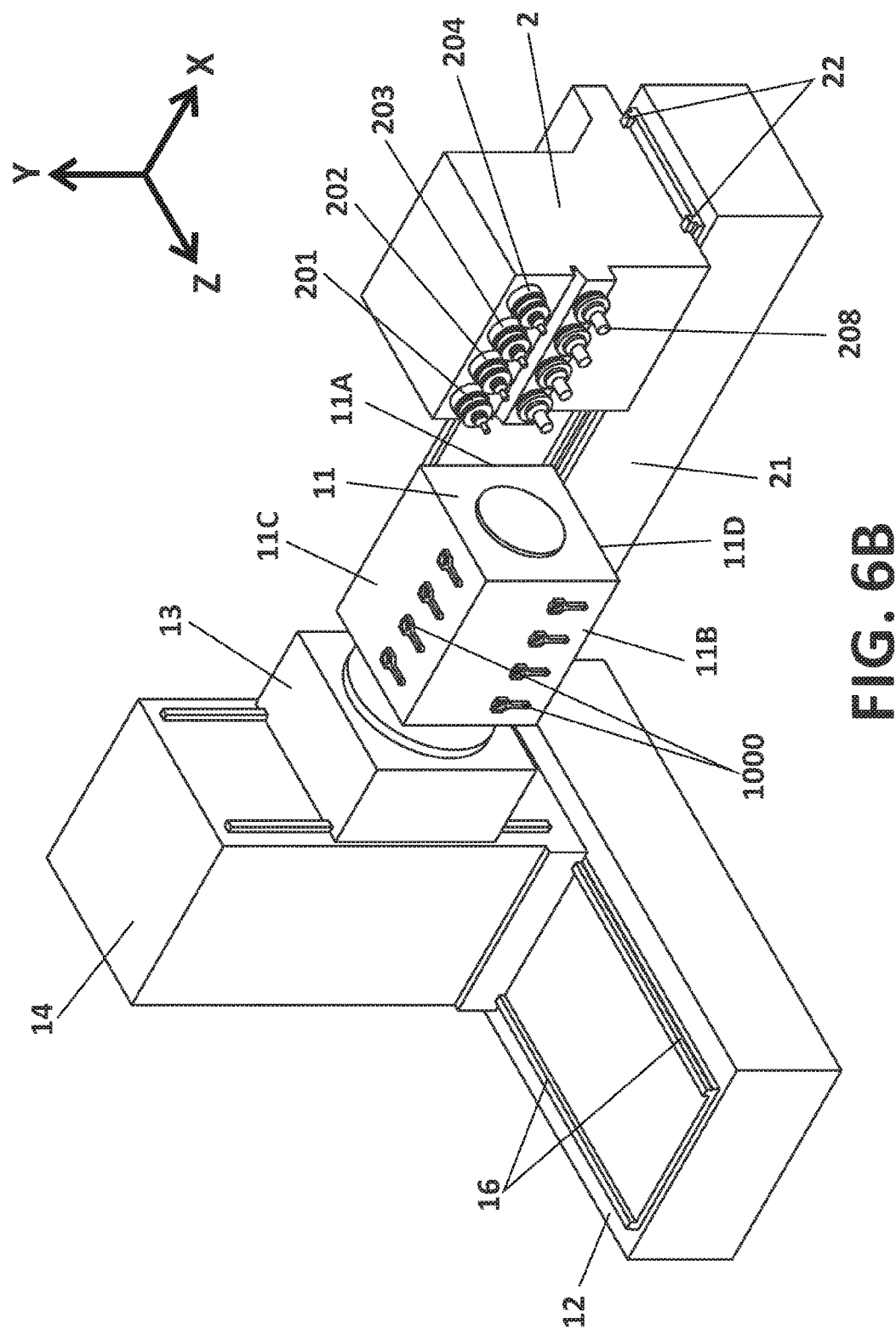

FIGS. 6A and 6B illustrate a variant of the embodiment illustrated in FIGS. 5A and 5B. FIG. 6A illustrates the machine tool during operation, the tools facing the workpieces, and FIG. 6B illustrates the machine tool with the tool carrier in a tool change position. In this variant, the workpiece carrier features four workpiece support areas 11A-11D, each corresponding to one of the sides of a generally parallelepipedal workpiece carrier body. With this arrangement, and using a clockwise rotation of the workpiece carrier 11 for switching between machining one set of workpieces and machining a new set of workpieces, the last set of workpieces to have been machined will be positioned downwards, corresponding to the position of workpiece support area 11D (the one opposite workpiece support area 11C) in FIGS. 6A and 6B, before arriving at the position for loading and unloading, occupied by workpiece support area 11B in FIGS. 6A and 6B. One advantage of this solution is that this can be useful for the removal of remains from the machining operations, typically metal chips, from the workpieces, by gravity and possibly also due to vibration, while other workpieces are being machined. That is, in the state of the machine tool illustrated in FIG. 6A, while the workpieces at workpiece support area 11A are being machined, and while unloading or loading can be taking place at workpiece support area 11B, chips may fall down from the recently machined workpieces placed at workpiece support area 11D.

Figure 7:
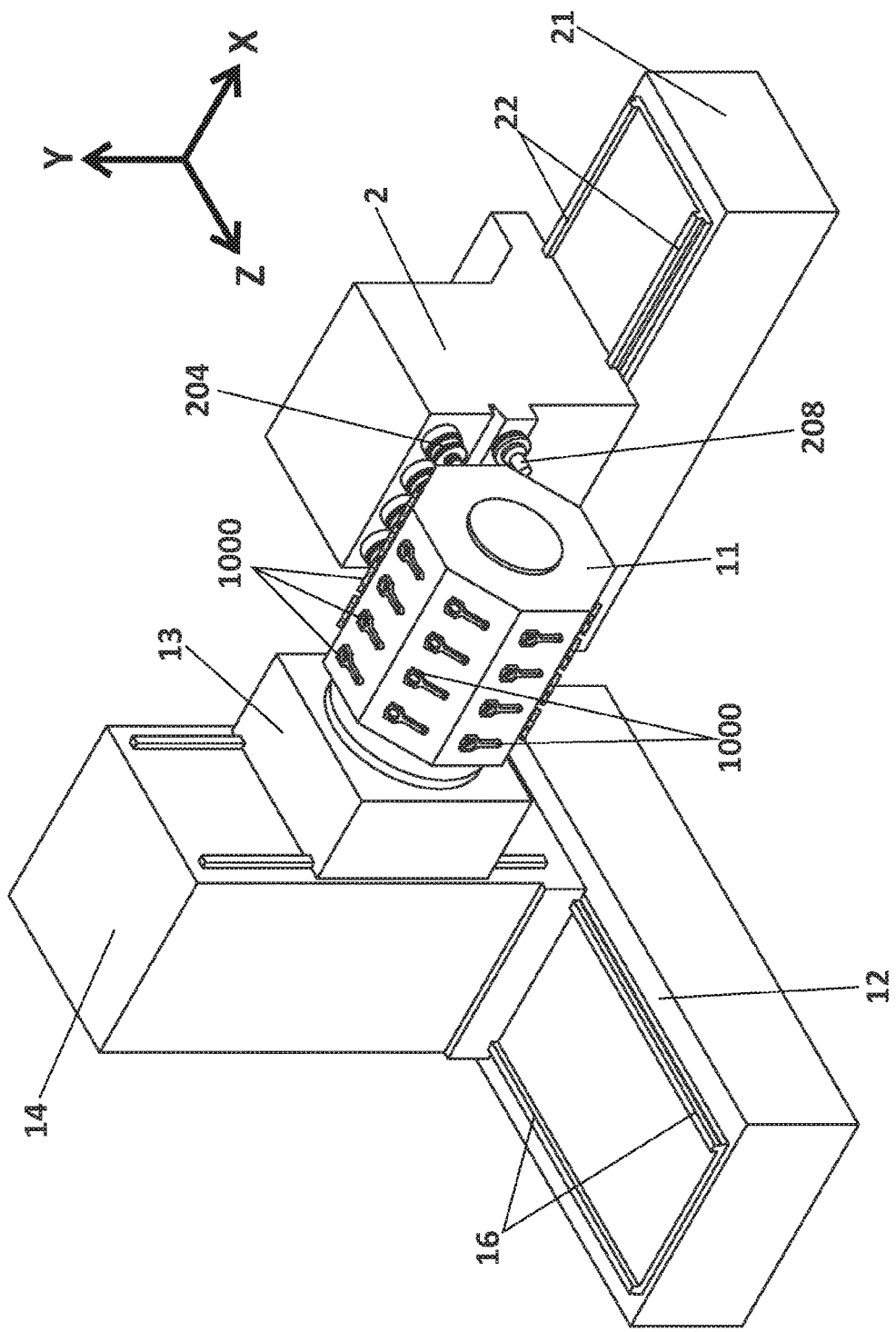
FIG. 7 is a perspective view of a variant of the embodiment illustrated in FIGS. 6A and 6B.

FIG. 7 illustrates an alternative embodiment according to which the workpiece carrier 11 features eight workpiece support areas, corresponding to the sides of a workpiece carrier body having an octagonal cross section.

Figure 8A:
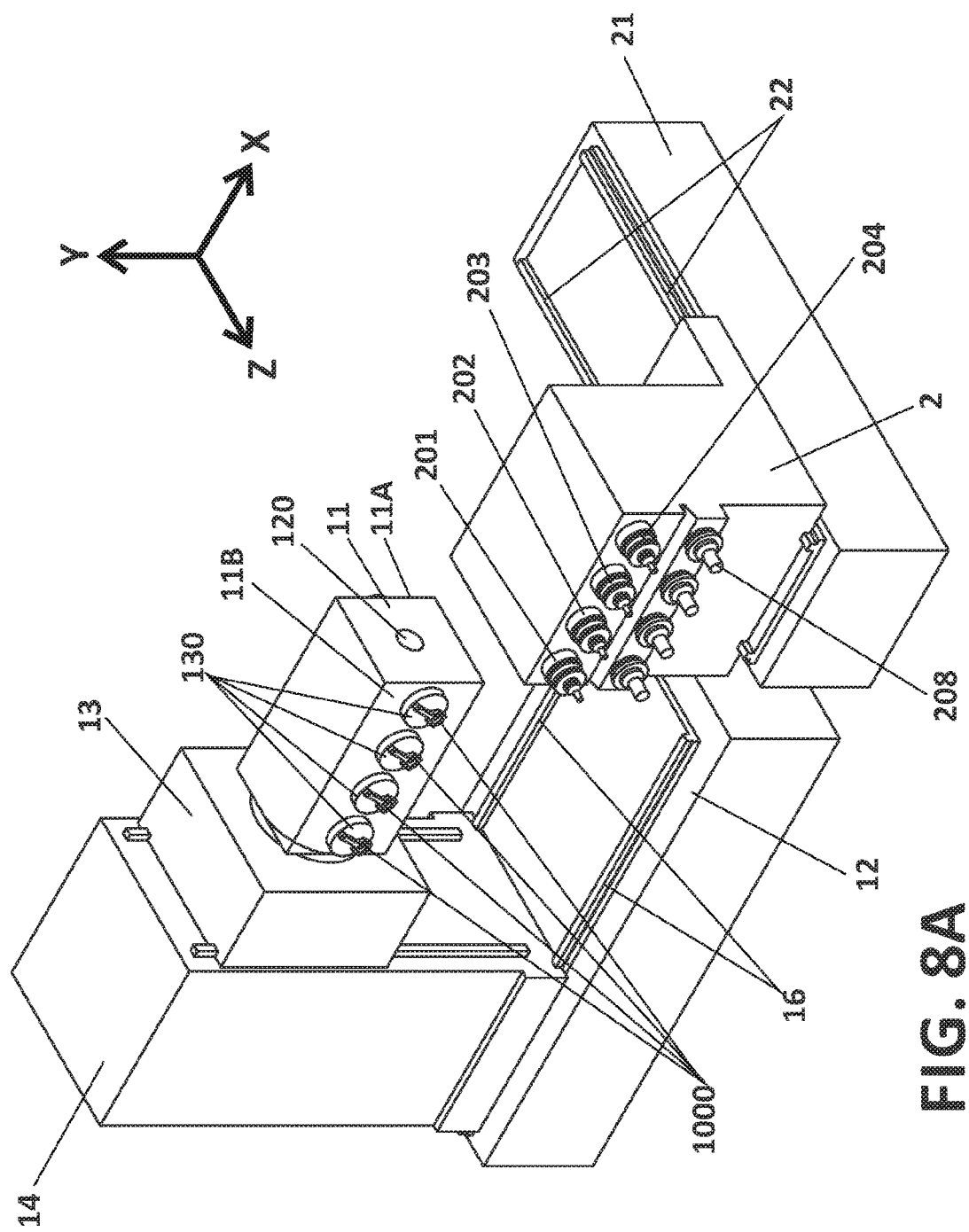
FIGS. 8A and 8B are perspective views of another embodiment.
Figure 8B:
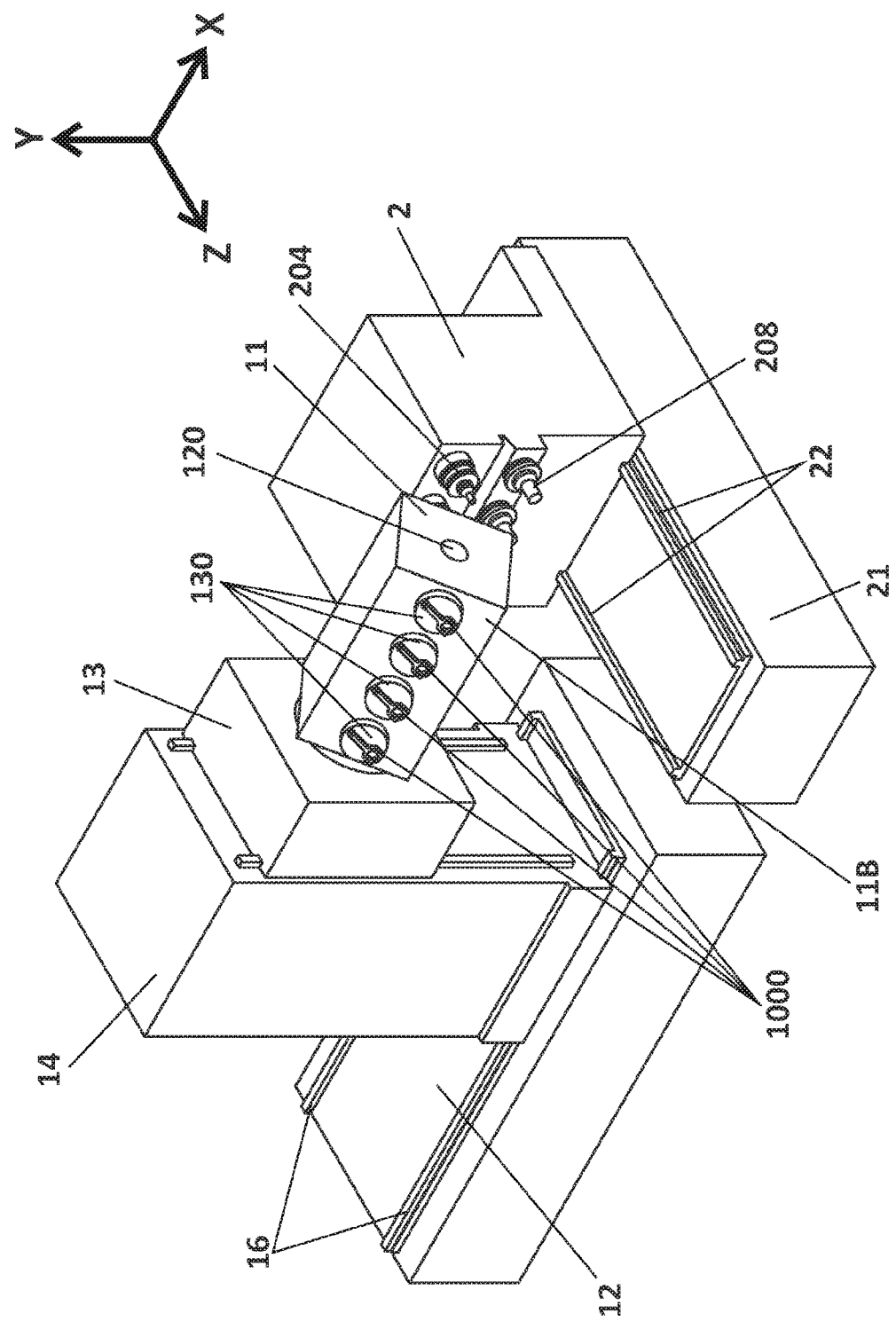

FIGS. 8A and 8B illustrate an embodiment with a basic layout in line with the one of FIGS. 4A-4D, but with a different workpiece carrier: here, the workpiece carrier is provided with rotatable platforms or supports 130, so that the workpieces 1000, in addition to turning around the X axis due to rotation of the workpiece carrier, can be turned around an axis perpendicular to said X axis, thereby further enhancing versatility and increasing the number of operations that can be carried out using a given orientation of the tools and spindles. The workpiece carrier 11 is additionally provided with a recess 120, which can be useful if an auxiliary support is incorporated, as explained below in relation to FIGS. 9A-9D.

Figure 9A:
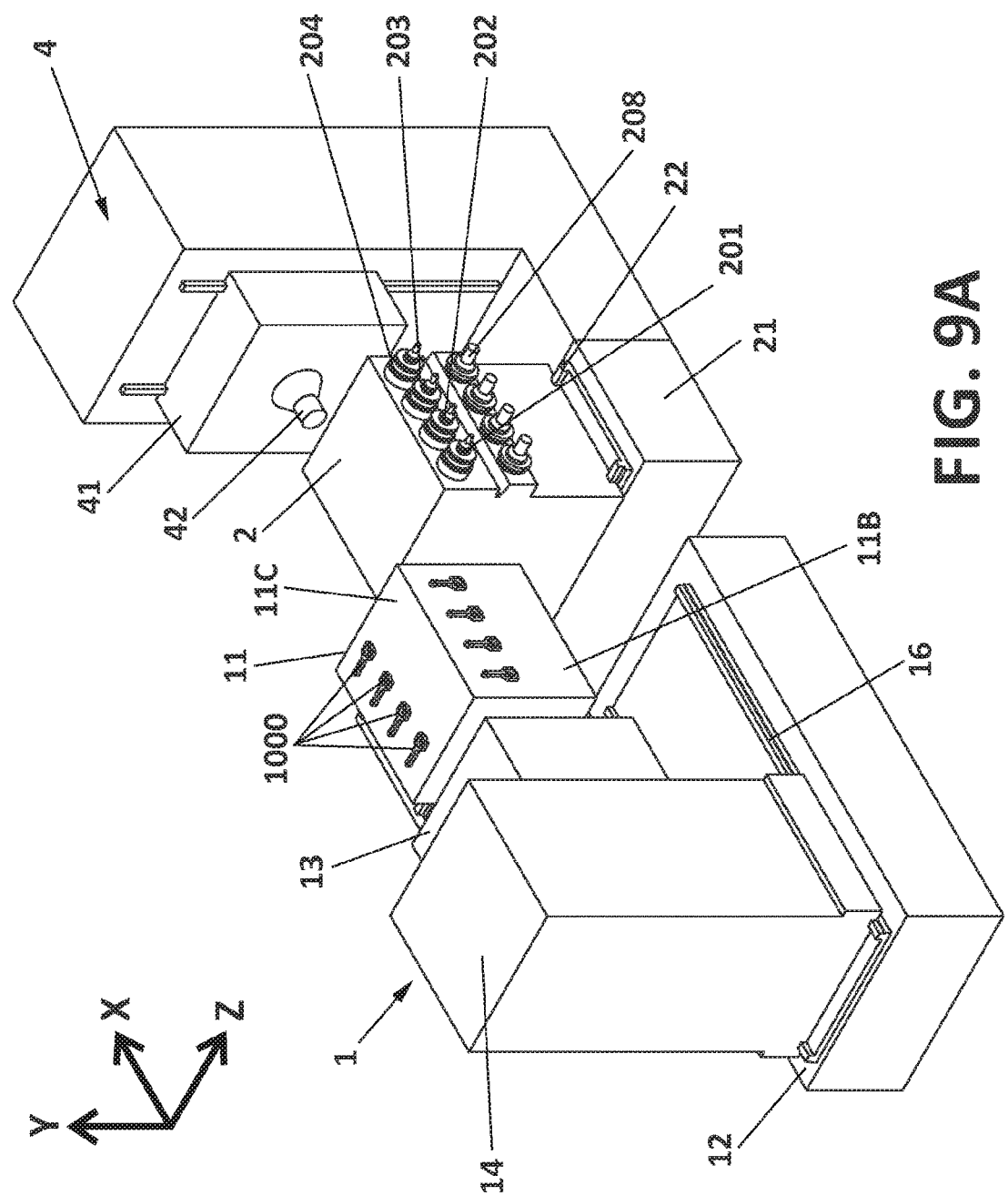
FIGS. 9A-9D are perspective views of yet another embodiment.
Figure 9B:
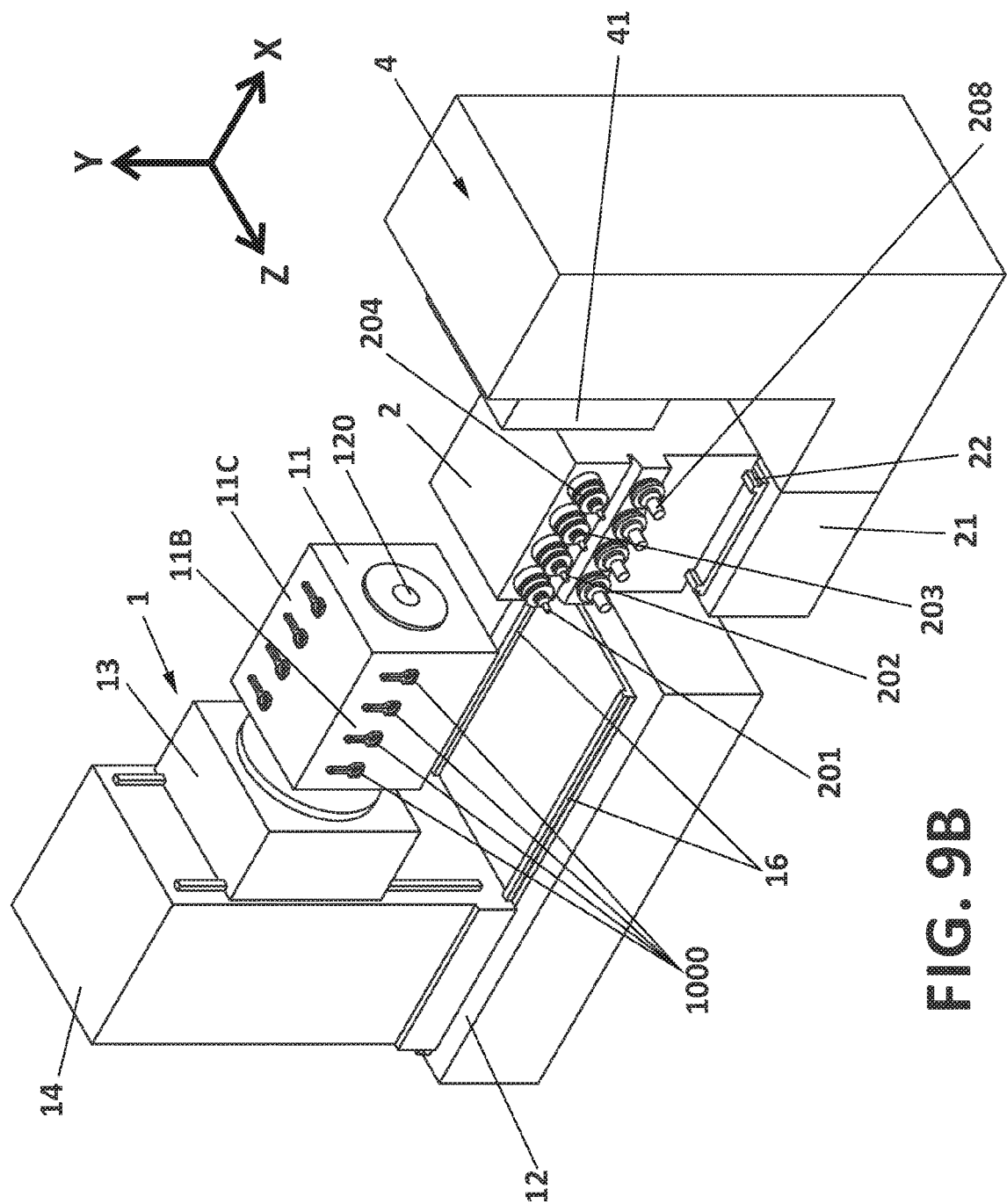
Figure 9C:
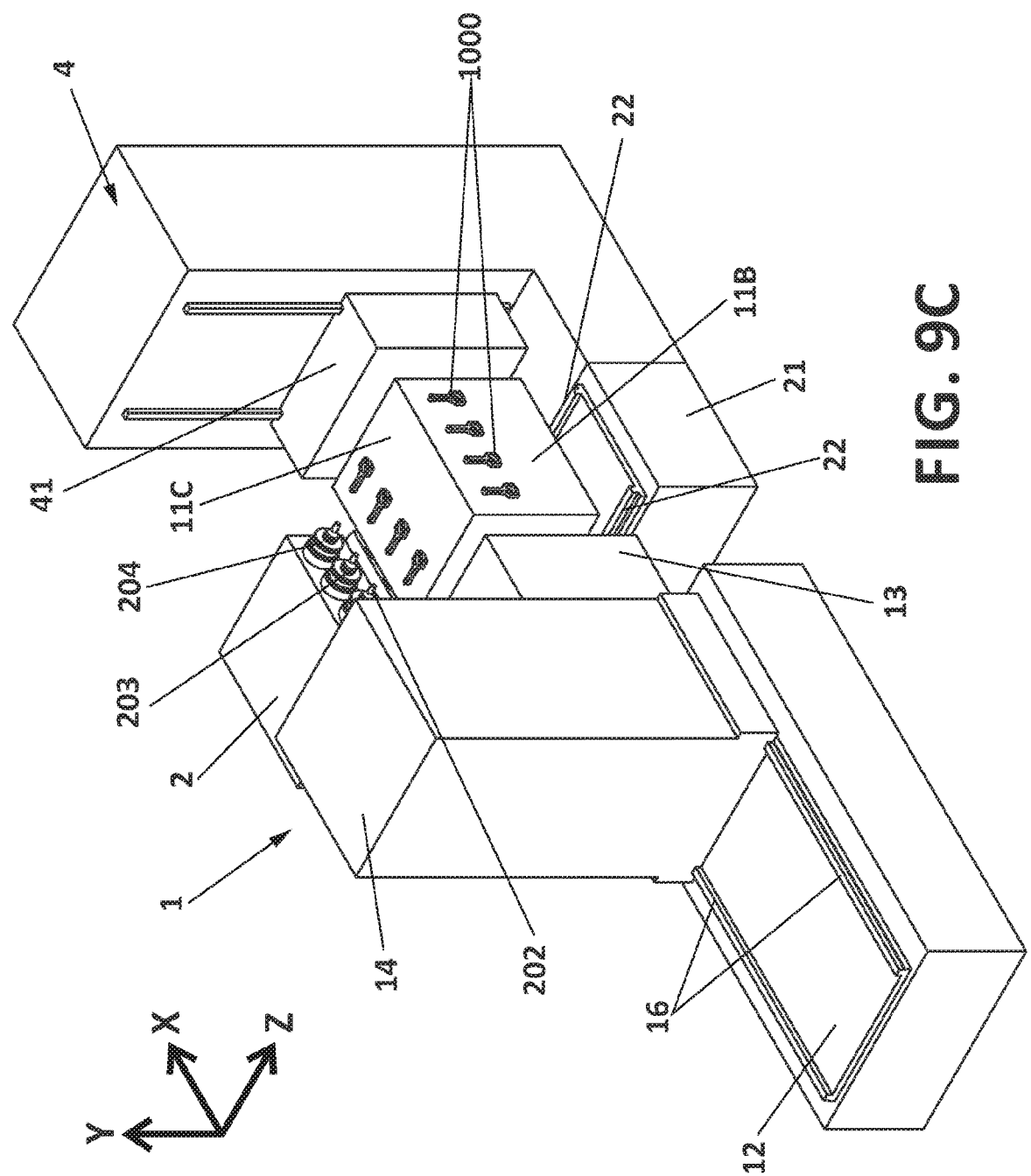
Figure 9D:
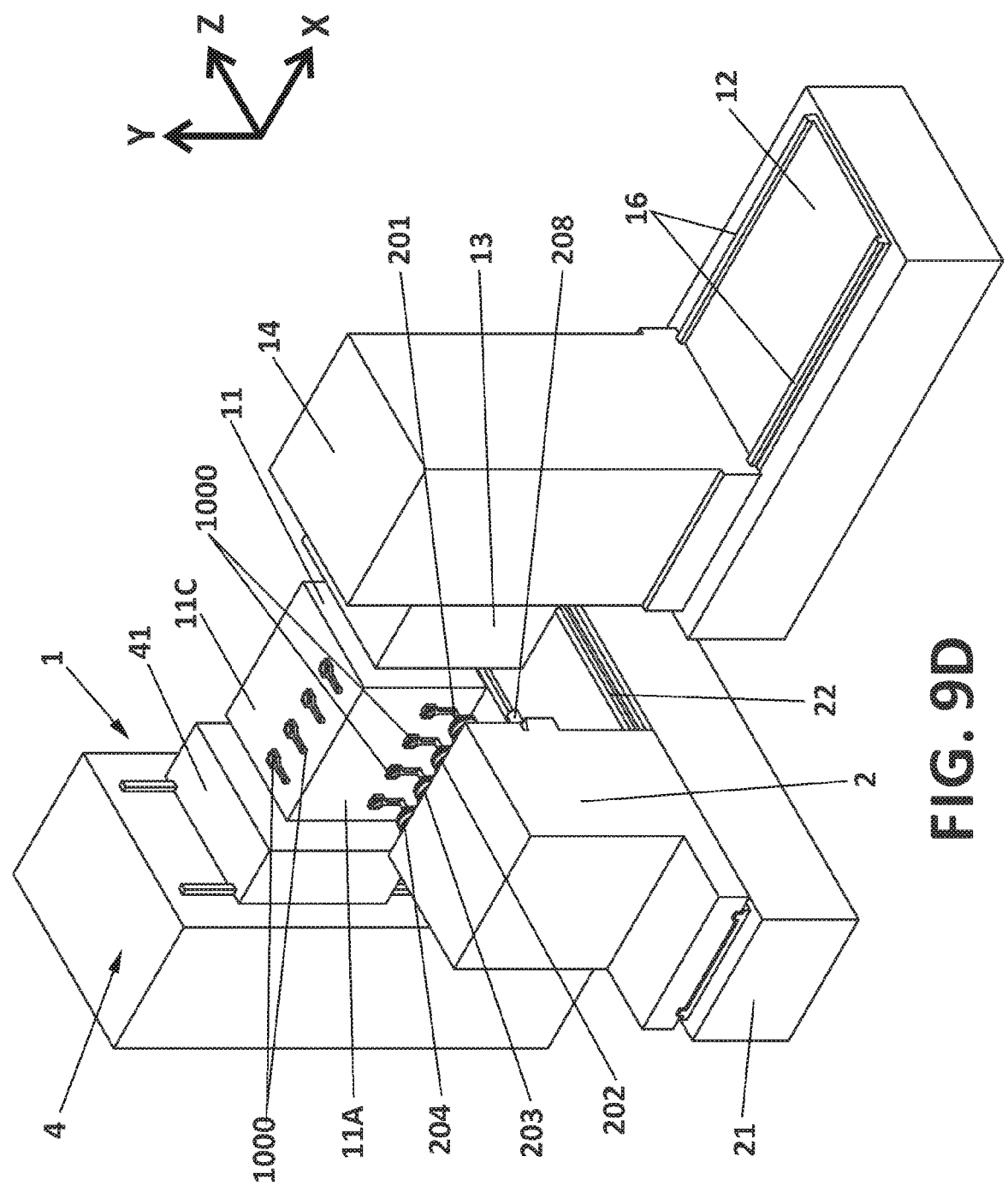

FIGS. 9A-9D illustrate a machine tool having a basic layout similar to the one of FIGS. 4A-4D, but with four workpiece support areas distributed according to the four sides of the parallelepipedal workpiece carrier body, and further including an auxiliary support 4. In the illustrated embodiment, the auxiliary support 4 is a stationary support, which includes a vertically moveable sledge 41 on which an engagement pin 42 is mounted. This pin is engaged to fit into the recess 120 of the workpiece carrier 11. In FIG. 11A, the machine tool is shown with the workpiece carrier assembly 1 in the inoperative position, and the tool carrier 2 in the tool change position, at the front end of the machine tool. Here, the workpiece carrier 11 is only supported on the workpiece carrier assembly, overhanging from the tower structure 14. FIG. 9B is a perspective view of the machine tool with the parts positioned as in FIG. 9A, but from a different angle, showing the recess 120 arranged to mate with the pin 42 of the auxiliary support.

Once the tool carrier 2 has moved back from the tool change position, the workpiece carrier assembly 1 is shifted in parallel with the X axis towards the operative position, approaching the auxiliary support 4. The position of the sledge 41 in the vertical direction is synchronized with the position of the tool carrier 11 in the vertical direction, so that the pin 42 can enter the recess 120, whereby the workpiece carrier 11 will be supported both on the tower structure 14 and carriage 13 of the workpiece carrier assembly 1, and on the auxiliary support 4, while being able to rotate around the X axis. This double support, at two sides of the workpiece carrier 11, can be useful to increase stability of the workpiece carrier during machining, and also to reduce the stresses and bending moments exerted on the tower structure 14 and carriage 13 when the machine tool is to remain idle for a substantial amount of time.

Figure 10A:
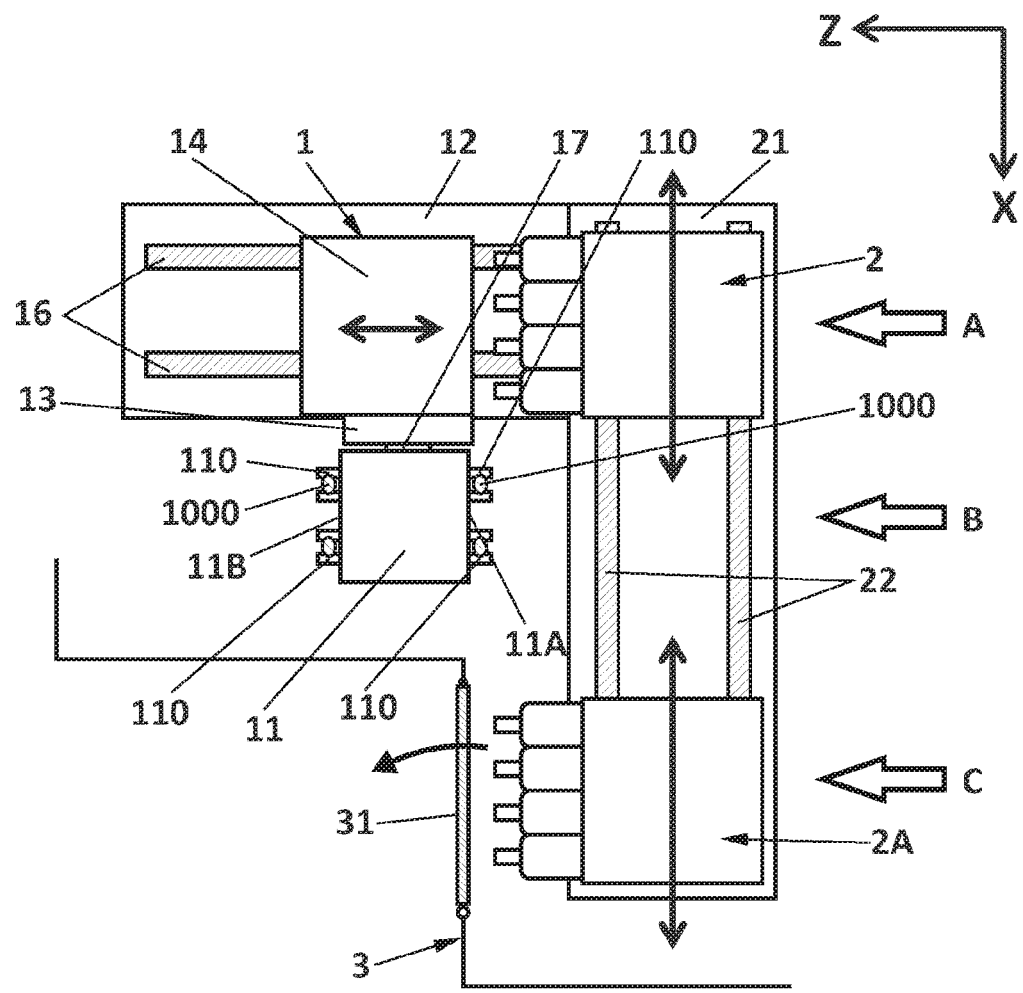
FIGS. 10A and 10B are top views of additional embodiments.

FIG. 10A illustrates an embodiment similar to the one of FIGS. 5A and 5B, but with an additional tool carrier 2A, displaceable on the tool carrier support 21 in parallel with the X axis. The tool carrier 2 is displaceable between the inoperative position A where it is not facing the workpiece carrier 11, and the operative position B where it is facing the workpiece carrier 11. Similarly, the additional tool carrier 2A is displaceable between the inoperative position C where it is not facing the workpiece carrier 11, and the operative position B where it is facing the workpiece carrier 11. Maintenance operations can be carried out on the additional tool carrier 2A or on its tools through the door 31, when the additional tool carrier 2A is in the inoperative position C. In what regards the tool carrier 2, maintenance may be slightly more laborious, but one option can be to move the workpiece carrier assembly 1 away from the tool carrier 2 along the X axis, and then access the space between, for example, the workpiece carrier 11 and the tool carrier 2 when the tool carrier is in the operative position B, for example. Another solution can be to extend the tool carrier support 21 establishing a further inoperative position beyond position A, to which the tool carrier 2 can be displaced when an operator desires to access the tool carrier for maintenance.

Figure 10B:
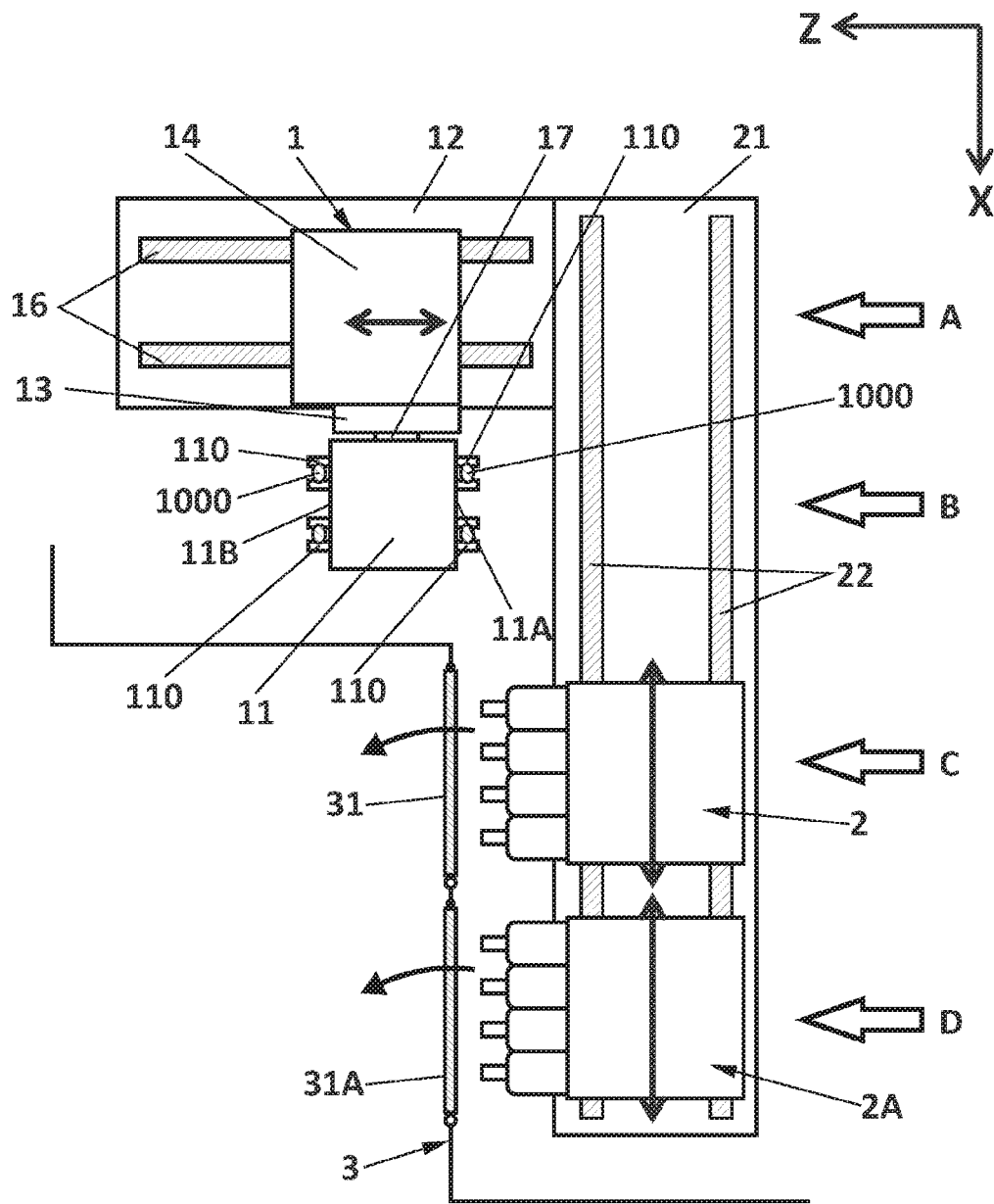

FIG. 10B illustrates an alternative embodiment, similar to the one of FIG. 10B but with a further inoperative position D added beyond position C. Also, a further door 31A has been added. Thus, as illustrated in FIG. 10B, the tool carrier 2 can be serviced through the door 31 when in the inoperative position C, and the tool carrier 2A can be serviced through door 31A when the tool carrier 2A is in the inoperative position D. Of course, in other embodiments of the disclosure, even more tool carriers can be used.

On the other hand, the disclosure is obviously not limited to the specific embodiment(s) described herein, but also encompasses any variations that may be considered by any person skilled in the art (for example, as regards the choice of materials, dimensions, components, configuration, etc.), within the general scope of the disclosure.

The invention claimed is:

1. Machine tool, comprising:
    a workpiece carrier assembly including a workpiece carrier for supporting a plurality of workpieces;
    a workpiece carrier support, the workpiece carrier assembly being supported on the workpiece carrier support for horizontal movement in a first direction on the workpiece carrier support, said first direction being parallel with a horizontal Z axis;
    a tool carrier configured for carrying a plurality of tools corresponding to the plurality of workpieces and for machining the workpieces by rotating said tools and simultaneously contacting the workpieces;
    a tool carrier support, said tool carrier being supported on said tool carrier support for horizontal movement in a second direction on said tool carrier support, said second direction being parallel to a horizontal X axis, said X axis being perpendicular to said horizontal Z axis;
    wherein said tool carrier is displaceable on said tool carrier support in said second direction between an operative position in which the tools are arranged for said contacting the workpieces and an inoperative position in which the workpieces are not contactable by said tools;
    wherein the workpiece carrier is arranged to be rotatable around an axis parallel with the X axis, to allow for a modification of an angular position of the workpieces in relation to the tool carrier;
    wherein the workpiece carrier comprises a workpiece support area for supporting said workpieces, said workpiece support area being arranged substantially in parallel with the X axis; and
    wherein said inoperative position comprises a tool change position in which said tool carrier is situated adjacent to an opening in an enclosure of the machine tool and is aligned with the opening along an axis parallel to the Z axis such that one or more of the tools is accessible through the opening from an exterior of the enclosure.

2. The machine tool according to claim 1, comprising an additional tool carrier configured for carrying an additional plurality of tools for machining the workpieces by rotating said tools of the additional plurality of tools, the additional tool carrier being displaceable on the tool carrier support in the second direction between the operative position and a further inoperative position in which the workpieces are not contactable by said tools of the additional plurality of tools.

3. The machine tool according to claim 1, wherein said tool carrier is configured to rotate each of said tools around a respective axis parallel to said Z axis.

4. The machine tool according to claim 1, wherein said workpiece support area comprises a first workpiece support area, the machine tool further comprising a second workpiece support area, said second workpiece support area being arranged for supporting a further plurality of workpieces, said first and second workpiece support areas being placed so that by rotating the workpiece carrier around said axis parallel to the X axis, one of said first and second workpiece support areas can selectively be brought to a position at which one of the first or second work piece support areas is loaded and unloaded, whereas the other of said first and second workpiece support areas is brought into a position in which the workpieces disposed thereon are arranged for said machining.

5. The machine tool according to claim 4, wherein said workpiece carrier comprises additional workpiece support areas, each for supporting a respective plurality of said workpieces, each said additional workpiece support area being arranged substantially in parallel with the X axis.

6. The machine tool according to claim 4, wherein the first and second workpiece support areas are angularly spaced about said axis that is parallel to the axis X.

7. The machine tool according to claim 6, wherein the angular spacing is 180 degrees such that the first and second workpiece support areas are arranged on opposite sides of the axis that is parallel to the X axis.

8. The machine tool according to claim 1, wherein the workpiece carrier is mounted so as to be displaceable in a vertical direction.

9. The machine tool according to claim 8, wherein the machine tool is configured to produce connecting rods from the plurality of workpieces by said machining.

10. The machine tool according to claim 8, wherein the vertical direction is parallel to a Y axis, where the Y axis is perpendicular to both the X and Z axes.

11. The machine tool according to claim 8, wherein the displacement of the workpiece carrier in the vertical direction is linear.

12. The machine tool of claim 1, wherein the workpiece carrier includes, in the workpiece support area, means for holding the workpieces, such that the workpieces are arranged one after another in a row that extends parallel to the X axis.

13. The machine tool of claim 12, wherein the plurality of tools are arranged for acting simultaneously on respective ones of the plurality of workpieces arranged one after the other in the row extending in parallel with the X axis.

14. The machine tool of claim 1, wherein said machine tool includes a door in said opening of the enclosure.

15. The machine tool according to claim 1, wherein the workpiece carrier support and the tool carrier support together have an L configuration, when viewed from above.

16. The machine tool according to claim 1, wherein the workpiece carrier support and the tool carrier support are placed on a floor and arranged to support the workpiece carrier assembly and the tool carrier, respectively, from below.

17. The machine tool according to claim 1, wherein the opening is in front of the tools of the tool carrier when the tool carrier is in the tool change position such that the tools may be said accessed and exchanged through the opening.

18. The machine tool according to claim 17, wherein the enclosure encloses the machine tool.

19. Machine tool, comprising:
a workpiece carrier assembly including a workpiece carrier for supporting a plurality of workpieces;
a workpiece carrier support, the workpiece carrier assembly being supported on the workpiece carrier support for horizontal movement in a first direction on the workpiece carrier support, said first direction being parallel with a horizontal Z axis;
a tool carrier configured for carrying a plurality of tools corresponding to the plurality of workpieces and for machining the workpieces by rotating said tools and simultaneously contacting the workpieces;
a tool carrier support, said tool carrier being supported on said tool carrier support for horizontal movement in a second direction on said tool carrier support, said second direction being parallel to a horizontal X axis, said X axis being perpendicular to said horizontal Z axis;
wherein said tool carrier is displaceable on said tool carrier support in said second direction between an operative position in which the tools are arranged for said contacting the workpieces and an inoperative position in which the workpieces are not contactable by said tools;
wherein the workpiece carrier is arranged to be rotatable around an axis parallel with the X axis, to allow for a modification of an angular position of the workpieces in relation to the tool carrier;
wherein the workpiece carrier comprises a workpiece support area for supporting said workpieces, said workpiece support area being arranged substantially in parallel with the X axis;
wherein the workpiece carrier is mounted so as to be displaceable in a vertical direction;
wherein the vertical direction is parallel to a Y axis, where the Y axis is perpendicular to both the X and Z axes; and
wherein the workpiece carrier assembly comprises a tower which extends longitudinally along the Y axis, wherein a first end of the workpiece carrier is disposed on the tower and the workpiece carrier extends from the tower from the first end of the workpiece carrier, in a direction parallel to the X axis, to an opposite free second end of the workpiece carrier, wherein the workpiece carrier is configured to travel along the tower in the vertical direction.

\* \* \* \* \*